US010853469B1

(12) United States Patent
McNamara et al.

(10) Patent No.: US 10,853,469 B1
(45) Date of Patent: Dec. 1, 2020

(54) USER INTERFACE LOCKING SYSTEM

(71) Applicant: AMAZON TECHNOLOGIES, INC., Reno, NV (US)

(72) Inventors: Alexander Michael McNamara, Seattle, WA (US); Benjamin Ralph Hollis, Seattle, WA (US); Sridhar Boyapati, Sammamish, WA (US); Félix Joseph Étienne Pageau, Seattle, WA (US); Nathan Lee Wesling, Seattle, WA (US); Korwin Jon Smith, Seattle, WA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 0 days.

(21) Appl. No.: 14/298,780

(22) Filed: Jun. 6, 2014

(51) Int. Cl.
*G06F 21/00* (2013.01)
*G06F 17/00* (2006.01)
*G06Q 30/06* (2012.01)
*G06F 21/36* (2013.01)
*G06F 3/0488* (2013.01)

(52) U.S. Cl.
CPC ............ *G06F 21/36* (2013.01); *G06F 3/0488* (2013.01)

(58) Field of Classification Search
CPC ......... G06F 21/36; G06F 21/32; G06F 3/0488
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 2004/0254844 | A1* | 12/2004 | Torres ............... G06Q 30/02 705/26.1 |
| 2008/0308630 | A1* | 12/2008 | Bhogal ............... G06Q 30/02 235/383 |
| 2009/0198734 | A1* | 8/2009 | Tessier ............... G01S 5/02 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013], Retrieved from the Internet: <URL:http://citeseerx.ist.psu.edu/viewdoc/summary?doi=10.1.1.127.3033>.

(Continued)

*Primary Examiner* — Noura Zoubair
(74) *Attorney, Agent, or Firm* — Lindauer Law, PLLC

(57) ABSTRACT

Described are systems and techniques configured to present information to a user of a materials handling facility that stores items in inventory locations. Some or all of the information may be designated as confidential or have restrictions on presentation to reduce or eliminate dissemination of the confidential information to unauthorized users. A device such as a display carried by the user, mounted on a tote or shelf, and so forth may present the confidential information on a user interface. Presentation of the confidential information, acceptance of user inputs to the user interface, or both may be based on identification of an authorized user, a relative position between the user and the display, or other factors.

20 Claims, 12 Drawing Sheets

(56) References Cited

U.S. PATENT DOCUMENTS

| | | | |
|---|---|---|---|
| 2010/0205667 A1* | 8/2010 | Anderson et al. | G06F 3/013 |
| | | | 726/19 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2014/0157424 A1* | 6/2014 | Lee | G06F 21/74 |
| | | | 726/26 |
| 2014/0164176 A1* | 6/2014 | Kitlyar | G06Q 30/0633 |
| | | | 235/383 |
| 2015/0086107 A1 | 3/2015 | Dedeoglu et al. | |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

\* cited by examiner

USER INTERFACE LOCKING SYSTEM

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to provide to users information associated with the items in inventory, other users, or other information about operation of the facility. Sometimes this information may be confidential or restricted, such that presentation is ideally limited to one or more particular users or groups of users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
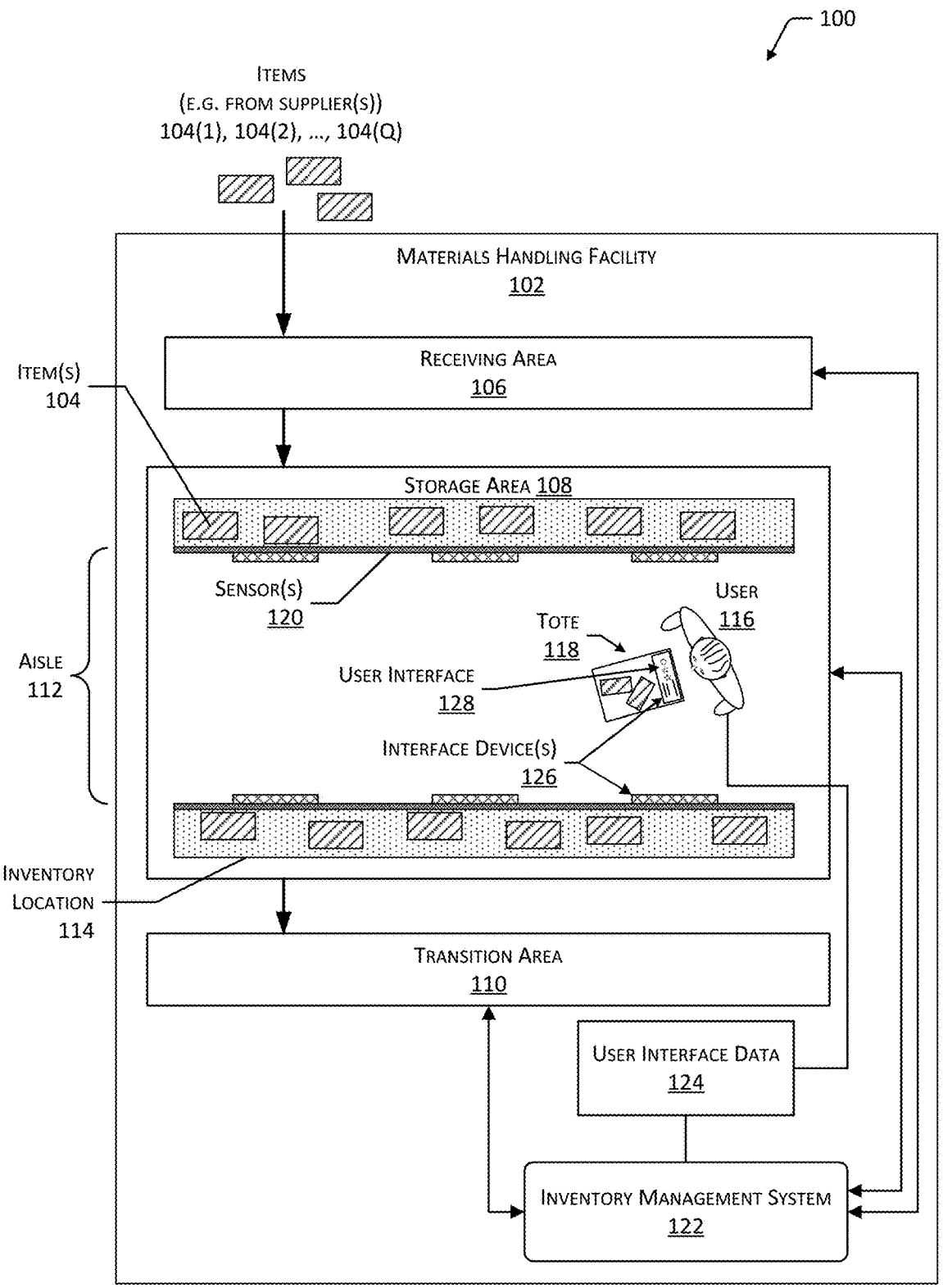
FIG. 1 is a block diagram illustrating a materials handling facility configured to present information to users in a user interface which locks and unlocks, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for managing a user interface provided to a user of a materials handling facility (facility). The facility may include, or have access to, an inventory management system. The inventory management system may be configured to maintain information about items, users, condition of the facility, and so forth. For example, the inventory management system may maintain operational data indicative of what items a particular user is ordered to pick, location of the particular user, availability of a user providing support services to others, requests for assistance, environmental status of the facility, and so forth. Presentation of the user interface may use one or more interface devices. The interface device may include one or more haptic output devices, audio output devices, display devices, and so forth. The user interface may include one or more of visible, audible, or haptic elements. For example, the visible elements may include graphical representations such as icons, images, video, graphs, text, and so forth while the audible elements may include particular sounds. The interface device may also include or be used in conjunction with an input device. For example, a display device may include a touch sensor to provide a touchscreen capable of presenting visible output and accepting touch input.

In some situations, at least a portion of the information presented by the user interface may be confidential, private, or otherwise be subject to restrictions on presentation, interaction, and so forth. For example, information about particular items such as an item name, cost, production facility, and so forth may be restricted to particular users with authorization to receive that information. In another example, information associated with the user, such as billing account number, wages earned, and so forth, may be deemed private.

To safeguard information designated as confidential, sensor data associated with the facility may be assessed using lock parameters to determine a lock state. The lock parameters specify conditions under which the user interface is to be unlocked or under which one or more locks are to be applied. These conditions may include authorized user identities, unauthorized user identities, a threshold distance between the authorized user and the interface device beyond which the user interface is to be locked, relative positions associated with particular lock states, and so forth.

The sensor data may include image data, information acquired from radio frequency tags, weight sensors, and so forth. For example, the image data may include an image of the user. The image data may be processed using facial recognition techniques to determine an identity of the user. The image data may also be processed to determine position of the user relative to the interface device. For example, the image data may include an image depicting the authorized user standing in front of the interface device.

The lock state of the user interface may dynamically change based on the conditions in the facility as ascertained using the sensor data and the lock parameters. For example, the lock state may be based on an identity of the user and a position of the user relative to the interface device used to present the user interface. Continuing the example, the user interface may be in an unlocked state when the identified user who is authorized to see the confidential information is in front of the interface device, but lock when an unauthorized user is in the same position. In another example, the lock state may be based on the authorized user which is associated with the interface device moving beyond a threshold distance. Continuing the example, as the authorized user moves away, the user interface may transition to the locked state.

The lock states may range from unlocked to various degrees of lock applied to the user interface. In the unlocked state, the user may view all information in the user interface. In a first locked state, the user interface may present all information including that deemed confidential, but may restrict the user interface from accepting input. In other lock states, at least a portion of the information presented by the user interface may be obscured, removed, or obfuscated. For example, the lock state may obscure particular information fields containing confidential information which are presented in the user interface by blurring those information fields. In another example, the lock state may discontinue presentation of all information in the user interface, and instead present a lock indicator or nothing.

The obfuscation of information may include replacing an element presenting confidential information with another element which holds significance to the authorized user but not to another user. For example, the obfuscation may include replacing an indicator that the item is highly valuable with a picture of a daisy. Based on previous training, the authorized user may understand the picture of the daisy as indicating the high value of the item. However, untrained users would be unaware of the significance.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow the user interface presented to the user of the facility to be unobtrusively transitioned between various lock states, responsive to occurrences in the facility. The locking may reduce or eliminate inadvertent dissemination of confidential information, unauthorized input, and so forth while retaining the ability for authorized users to perform functions within the facility. As a result, the user experience of the users in the facility and overall operation of the inventory management system may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, imaging sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain imaging sensors configured to acquire images of pick or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking how objects move within the facility 102. For example, a series of images acquired by an imaging sensor may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from presentation of information such as the pick list for that user 116, personal picking scores, compensation earned, total cost of picked order, stock keeping unit (SKU), item name, description, packaging information, and so forth.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include imaging sensors configured to acquire image data of scenes in the facility 102. The image data may be processed by the inventory management system 122 to determine a position of the user 116, the tote 118, identity of the user 116, and so forth. The sensors 120 are discussed in more detail below with regard to FIG. 2.

The inventory management system 122 is configured to generate user interface data 124 based at least in part on the sensor data. One or more interface devices 126 may use the user interface data 124 to present a user interface 128 which may be perceived by the user 116. The user interface 128 may include one or more elements including visual, haptic, audible, olfactory, and so forth. The interface devices 126 are discussed in more detail below with regard to FIGS. 2 and 4.

Information presented by the user interface 128, or a portion thereof, may be confidential, private, or otherwise be subject to restrictions on presentation, interaction, and so forth. Designation of information as confidential may be made by the user 116, another human, an automated system, and so forth. Confidentiality may be associated with one or more of a user identity, an item 104, and so forth. For example, the user 116 may specify that an individual pick error rate is confidential. In another example, a supplier may designate certain information about the item 104 to be confidential.

To safeguard the information designated as confidential, the inventory management system 122 may assess the sensor data using lock parameters to determine a lock state to apply to the user interface 128. The lock parameters specify conditions under which the user interface 128 is to have a lock applied, and if so, what lock to apply. These conditions may include authorized user identities, unauthorized user identities, a threshold distance between the authorized user 116 and the interface device 126 beyond which the user interface 128 is to be locked, relative positions associated with particular lock states, and so forth. The lock parameters may be associated with a particular user, groups of users, and so forth. The sensor data may be analyzed to determine which, if any, of the conditions have been met and determine the lock state.

The lock states may range from unlocked to various degrees of lock applied to the user interface 128. In one implementation the lock state may be included in the user interface data 124. For example, the user interface data 124 provided to the interface device 126 may include the confidential information and also instructions to blur the confidential information. In another implementation the lock state may be used during the generation of the user interface data 124. For example, the user interface data 124 may include a blurred representation of the confidential information which is then provided to the interface device 126.

Where the lock state specifies the unlocked state, the user 116 may view all information in the user interface 128 and input from the user 116 may be accepted and processed. In comparison, in a first locked state, the user interface 128 may present all information including that deemed confidential, but may restrict the user interface 128 from accepting input. In other lock states, at least a portion of the information presented by the user interface 128 may be obscured, removed, or obfuscated. For example, one or more of the visual elements may be blurred or may not be presented on an interface device 126.

The lock state of the user interface 128 may dynamically change based on the conditions in the facility 102 as ascertained using the sensor data and the lock parameters. For example, the lock state may be based on an identity of the user 116(1) and a position of the user 116(1) relative to the interface device 126 used to present the user interface 128. Continuing the example, the user interface 128 may be in an unlocked state when the identified user 116(1) who is authorized to see the confidential information is in front of the interface device 126, but lock when an unauthorized user 116(2) is in the same position. In another example, the lock state may be based on the authorized user 116 which is associated with the interface device 126 moving beyond a threshold distance. Continuing the example, as the authorized user 116 moves away, the user interface 128 may transition to the locked state.

Responsive to the lock state, the user interface data 124 may also specify whether input received by the interface device 126 while presenting the user interface 128 is to be processed, and if so, how. For example, the user interface data 124 may comprise instructions which configure the user interface 128 to present information but disregard any input made to the interface device 126 by a user 116.

In some implementations, the user interface data 124 may also include information which designates a particular interface device 126. For example, a particular interface device 126 may be associated with a particular user 116. The particular interface device 126 may present the resulting user interface 128 to the particular user 116. As a result, the confidential information in the user interface 128 is presented to the appropriate user 116 authorized for that information.

The user interface data 124 may comprise commands, instructions, tags, markup language, images, color values, text, or other data. For example, the user interface data 124 may be expressed as hypertext markup language (HTML), cascading style sheets (CSS), JavaScript, and so forth. The user interface data 124 may implement one or more of the lock states in the user interface 128. In some implementations, the user interface data 124 may be rendered by the interface device 126 to present the user interface 128.

The lock state may be determined at regular intervals, upon occurrence of one or more trigger events, and so forth. For example, based on a change in the relative position of the user 116 with respect to the tote 118 upon which the interface device 126 is mounted, the lock state may be updated. Correspondingly, updated user interface data 124 may also be sent to the interface device 126, changing the lock manifested by the user interface 128.

By using the inventory management module 122 to dynamically change the lock state, the overall user experience may be improved while enhancing the security of confidential information. For example, the user interface 128 presents the confidential information for the user 116, but once the user 116 steps away from the tote 118 assigned for their use, the user interface 128 may assume a locked state, without intervention by the user 116. As the user 116 returns to the tote 118, the user interface 128 may assume an unlocked state for the user 116, again without intervention by the user 116. The transition between lock states may occur seamlessly and automatically.

Figure 2:
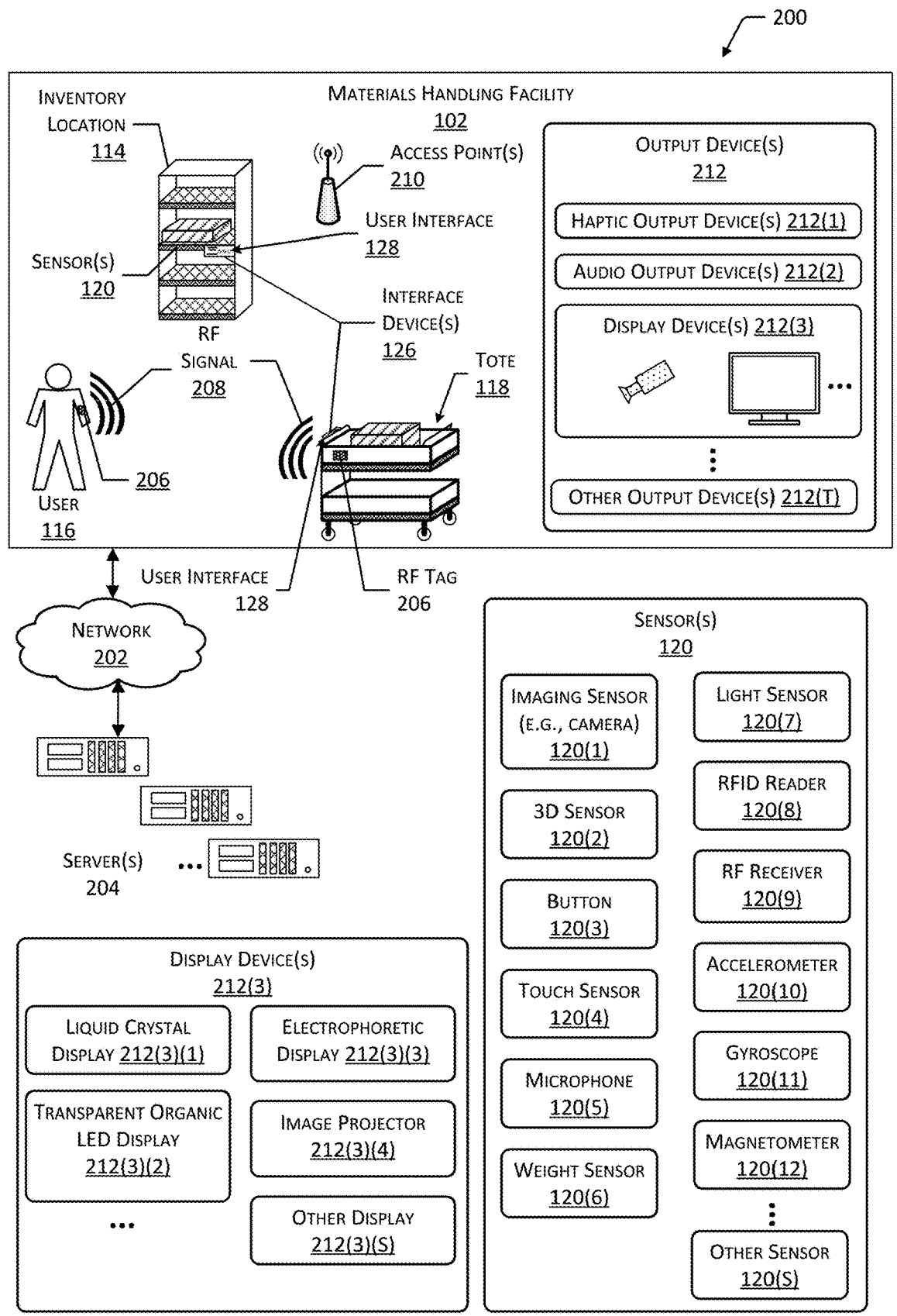
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth which may be read and, based at least in part on signal strength, used to determine identity and position. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, in the interface device 126, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a position of an object, and so forth. For example, the inventory management system 122 may determine operational data such as position in the facility 102 of the user 116 based at least in part on the position in three-dimensional space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) in a handle such that the button 120(3) is activated while the user 116 is holding the handle. The inventory management system 122 may use this information to ensure that the user 116 is proximate to the tote 118, and determine the lock state of the user interface 128.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the position of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the user interface 128.

One more radio frequency identification (RFID) readers 120(8), near field communication (NFC) systems, and so forth may also be provided in the sensors 120. For example the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8), a velocity of the RF tag 206 may be determined and used as kinematic data.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth may be determined using the accelerometers 120(10).

A gyroscope 120(11) provides information indicative of rotation of an object affixed thereto. For example, the tote 118, the interface device 126, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may be worn or carried by the user 116, mounted to the tote 118, attached to the interface device 126, and so forth. For example, the magnetometer 120(12) mounted to the tote 118 may act as a compass and provide information indicative of which way the tote 118 is oriented.

The sensors 120 may include other sensors 120(S) as well. For example the other sensors 120(S) may include proximity sensors, ultrasonic rangefinders, thermometers, barometric sensors, hygrometers, or biometric input devices including but not limited to fingerprint readers or palm scanners. For example, the inventory management system 122 may use information acquired from thermometers and hygrometers in the facility 102 to modify the user interface 128 to direct the user 116 to check on delicate items 104 stored in a particular inventory location 114.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the interface devices 126, the RF tag 206, a communication device of the tote 118, or other devices.

Output devices 212 may also be provided in the facility 102. The output devices 212 are configured to generate signals which may be perceived by the user 116.

Haptic output devices 212(1) are configured to provide a signal which results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetostrictive elements, or electrostatic elements, and so forth. For example, a piezoelectric buzzer or a speaker may be used to provide acoustic output.

The display devices 212(3) may be configured to provide output which may be seen by the user 116, or detected by a light-sensitive detector such as an imaging sensor 120(1) or light sensor 120(7). The output may be monochrome or color. The display devices 212(3) may be emissive, reflective, or both. An emissive display device 212(3) is configured to emit light during operation. For example, a light emitting diode (LED) is an emissive visual display device 212(3). In comparison, a reflective display device 212(3) relies on ambient light to present an image. For example, an electrophoretic display 212(3)(3) is a reflective display device 212(3). Backlights or front lights may be used to illuminate the reflective visual display device 212(3) to provide visibility of the information in conditions where the ambient light levels are low.

Mechanisms of the display devices 212(3) may include liquid crystal displays 212(3)(1), transparent organic light emitting diodes (LED) displays 212(3)(2), electrophoretic displays 212(3)(3), image projectors 212(3)(4), or other displays 212(3)(S). The other displays 212(3)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(3) may be configured to present images. For example, the display devices 212(3) may comprise a pixel-addressable display. The image may comprise at least a two-dimensional array of pixels, or a vector representation of an at least two-dimensional image.

In some implementations, the display devices 212(3) may be configured to provide non-image data, such as text characters, colors, and so forth. For example, a segmented electrophoretic display 212(3)(3), segmented LED, and so forth may be used to present information such as a SKU number. The display devices 212(3) may also be configurable to vary the color of the text, such as using multicolor LED segments.

In some implementations, display devices 212(3) may be configurable to provide image or non-image output. For example, an electrophoretic display 212(3)(3) with addressable pixels may be used to present images of text information, or all of the pixels may be set to a solid color to provide a colored panel.

The interface device 126 may include the sensors 120, the output devices 212, or both. In some implementations the interface device 126 may include hardware processors, memory, and other elements configured to accept and process the user interface data 124 to present the user interface 128, process input for the user interface 128, and so forth.

Other output devices 212(T) may also be present. For example, the other output devices 212(T) may include scent/odor dispensers, document printers, three-dimensional printers or fabrication equipment, and so forth.

The inventory management system 122 may generate the user interface data 124 which is then used by the interface device 126 to present the user interface 128. The user interface 128 may be configured to stimulate one or more senses of the user 116. For example, the user interface 128 may comprise visual, audible, and haptic output.

Figure 3:
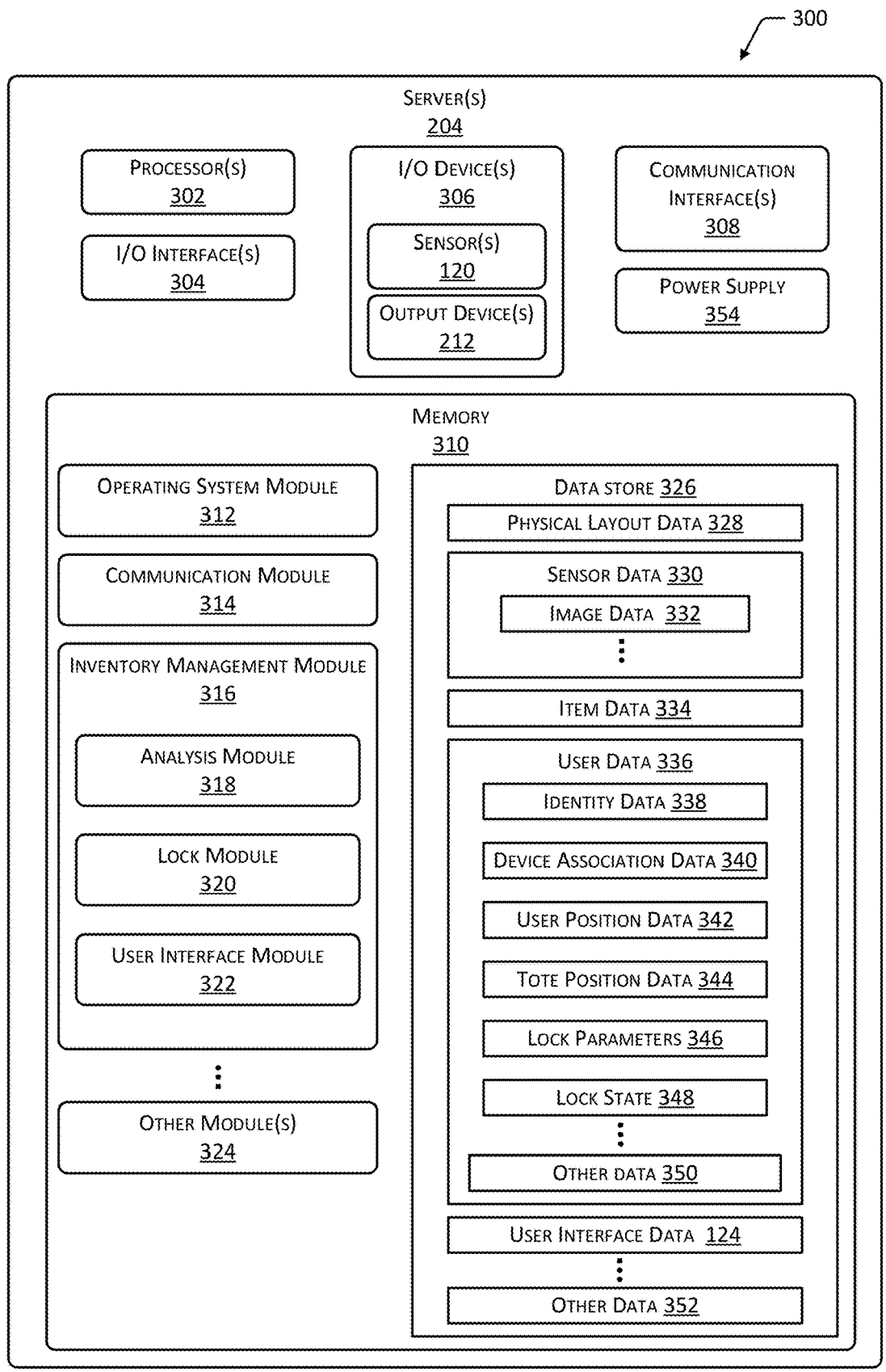
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the interface devices 126, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the interface devices 126, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may be configured to generate the user interface data 124 which may be used by the interface device 126 to present the user interface 128. The inventory management module 316 may include one or more of an analysis module 318, a lock module 320, and a user interface module 322.

The OS module 312, the communication module 314, the inventory management module 316, and other modules 324 may also access information stored in a datastore 326 described below.

The analysis module 318 is configured to generate data based at least in part on one or more of physical layout data 328, sensor data 330 from the one or more sensors 120, item data 334, and so forth. The sensor data 330 may include image data 332 acquired by one or more of the imaging sensors 120(1).

The analysis module 318 may include pattern recognition techniques, machine learning, heuristics, or other techniques to generate data. The data may include item data 334, user data 336, and so forth. The user data 336 may include identity data 338, device association data 340, user position data 342, tote position data 344, and so forth. For example, the analysis module 318 may include an object recognition module configured to recognize the tote 118 in the image data 332, a facial recognition module configured to recognize and identify faces within the image data 332, and so forth.

The identity data 338 provides information indicative of an identity of the user 116. The identity data 338 may specify a user name, account number, government issued identification string, and so forth. The identity data 338 may be determined using various authentication techniques such as multi-factor authentication, usernames and passwords, biometrics, and so forth. For example, the identity data 338 may be determined by analyzing characteristics of the user 116, such as facial characteristics, fingerprint characteristics, iris characteristics, and so forth. For example, the analysis module 318 may use facial recognition techniques to process the image data 332 and determine the identity data 338 of the user 116 depicted in the images by comparing the characteristics in the image data 332 with previously stored values.

In some implementations the identity data 338 may include estimates of accuracy. For example, the identity data 338 may indicate the user 116(1) is "Ted Q. Smith" with an estimated confidence level that this identity is correct of 95%. In some implementations the identity data 338 may distinguish one user 116 from another without further information. For example, the identity data 338 may distinguish user 116(1) from user 116(2), but may omit the information such as real or legal names of each.

The device association data 340 provides information which is indicative of the interface device 126 assigned for use by, is in use by, or was in use by a particular user 116. For example, the user 116(1) may be associated with the interface device 126(1) affixed to tote 118(1). The tote 118(1) may have been assigned to the user 116(1) when the user 116(1) entered the facility 102. In another implementation, the tote 118(1) may be determined to be associated with the user 116(1) based on scanning an RF tag 206(1) of the tote 118(1) and an RF tag 206(2) of the user 116(1).

The device association data 340 may indicate a particular user 116 is authorized to use a particular interface device 126, tote 118, and so forth. For example, the device association data 340 may indicate that the user 116(1) is permitted to use the tote 118(1) and the interface device 126(1).

The user position data 342 provides information indicative of a position of the user 116. The position may be absolute with respect to the facility 102, or relative to another object or point of reference. Absolute terms may comprise a latitude, longitude, and altitude with respect to a geodetic reference point. Relative terms may include a position of 25.4 m along an x-axis and 75.2 m along a y-axis is designated by a floor plan of the facility 102, 5.2 m from an inventory location 114 along a heading of 169°, and so forth. For example, the user position data 342 may indicate that the user 116(1) is 25.2 m along the aisle 112(1) and standing in front of the inventory location 114(47). In comparison, a relative position may indicate that the user 116 is 32 cm from the tote 118 at a heading of 73° with respect to the tote 118. The user position data 342 may include orientation information, such as which way the user 116 is facing. The orientation may be determined by the relative direction the user's body is facing. In some implementations, the orientation may be relative to the interface device 126. Continuing the example, the user position data 342 may indicate that the user 116(1) is oriented with a heading of 0°, or looking north. In another example, the user position data 342 may indicate that the user 116 is facing towards the interface device 126.

Similarly, the tote position data 344 provides information indicative of the position of the tote 118. The position may be absolute with respect to the facility 102, or relative to another object or point of reference. The tote position data 344 may include orientation information, such as which way the tote 118 is facing.

Using the sensor data 330, the analysis module 318 may generate the user position data 342, the tote position data 344, or both. For example, the image data 332 acquired by the imaging sensors 120(1), the 3D sensors 120(2), microphones 120(5), weight sensors 120(6), signal strength data from the RFID readers 120(8) or the RF receivers 120(9), and so forth may be used to determine the positions.

The lock module 320 is configured to access and use lock parameters 346 to assess data and determine a lock state 348 of the user interface 128. The data assessed may include one or more of physical layout data 328, sensor data 330, item data 334, identity data 338, device association data 340, user position data 342, tote position data 344, and so forth. For example, particular lock states 348 may be associated with particular items 104, inventory locations 114, users 116, totes 118, or combinations thereof.

The lock parameters 346 specify conditions under which the user interface 128 is to have a lock applied, and if so, what lock to apply. These conditions may include one or more of a list of authorized or unauthorized user identities, a threshold distance between the authorized user and the interface device beyond which the user interface is to be locked, relative position of the user 116 with respect to the interface device 126, category of item, item identifier, and so forth. The lock parameters 346 may, at least partially, specify conditions under which the user interface 128 presents information, accepts input, or both presents information and accepts input. For example, the lock parameters 346 may specify an unlocked lock state 348 while the user 116 faces towards the interface device 126, and a locked lock state 348 while user 116 faces away from the interface device 126.

In another example, lock states may be associated with one or more categories of items 104. Continuing the example, the categories may specify groupings of types of items, such as "food", "jewelry", "health and hygiene", "electrical parts", "toys", "high dollar value", and so forth. The lock parameters 346 may specify particular lock states for items 104 in particular categories. For example, during pick and place operations involving the category of "high dollar value", a product description and price of the item 104 may be obscured in the user interface 128.

The analysis module 318 may determine a distance between the user 116 and the interface device 126. This determination may involve determining which interface device 126 is associated with the user 116, such as by accessing the device association data 340. Once the interface device 126 associated with the user 116 has been determined, a distance between the two may be calculated using the user position data 342 and position information about the interface device 126. For example, the interface device 126 may be affixed to a tote 118, and the tote position data 344 may be used. By comparing the distance between the user 116 and the interface device 126 with threshold distances specified in the lock parameters 346, the lock module 320 may determine that the user 116 is beyond the threshold distance. The lock parameters 346 may specify the lock state 348 for this condition is one in which a lock indicator user interface element is presented and input to the user interface 128 is disregarded.

The lock parameters 346 may include multiple conditions associated with a particular lock state 348. For example, the lock state 348 may be determined based on identity of user 116, distance to the interface device 126, orientation relative to the interface device 126, identity of another user 116 proximate to the interface device 126, and so forth. Furthermore, different sets of lock parameters 346 may be associated with a single lock state 348. For example, there may be many different sets of conditions which are associated with a locked lock state 348.

In some implementations the lock module 320 may be configured to account for the physical layout of the facility 102 in the determination of the lock state 348. The lock module 320 may access the physical layout data 328 to determine if there are walls, inventory locations 114, or other objects which prevent information presented by the user interface 128 from being inadvertently distributed to an unauthorized user 116. For example, the physical layout data 328 may indicate that while the unauthorized user 116 is 1 m away from the interface device 126 (which might otherwise change the lock state 348), a wall is between the interface device 126 and the unauthorized user 116, and so the lock state 348 may remain unaffected.

The lock parameters 346 may be predetermined or dynamically adjusted. For example, a threshold distance may have a first value of 3 m when the facility 102 is sparsely populated by users 116, and a second value of 1 m and the facility 102 is filled with users 116. In another example, the lock parameters 346 may be configured to vary with date, time of day, day of week, season, and so forth. In some implementations, the user 116 may customize or otherwise indicate preferences for the lock parameters 346.

The lock state 348 is data which indicates locking to be applied to the user interface 128. The lock state data 348 may encompass unlocked, partially locked, locked, and so forth. For example, the lock state 348 of "unlocked" does not restrict the information presented in the user interface 128 or the input received from the user interface 128. In comparison, the lock state 348 of "locked" may restrict the information presented in the user interface 128 to a lock indicator user interface element, may restrict acceptance of input to the user interface 128, or a combination thereof. Different lock states 348 may also be designated. For example, an intermediate lock state 348 may present information in the user interface 128 without restriction, but disregards any input to the user interface 128. Examples of the lock state 348 as manifested in the user interface 128 are described below in more detail with regard to FIGS. 7-9.

Values determined by the analysis module 318, the lock module 320, and others may be expressed in terms of a confidence value. The lock state 348 may be based at least in part on the confidence value. For example, the analysis module 318 may only be able to identify the user 116 with an 85% likelihood that the identification is correct. The lock module 320 may be configured to set a lock state 348 which disregards input to the user interface 128 when the confidence value of the identification is below 90%.

The user interface module 322 is configured to generate user interface data 124. The user interface data 124 may include or be based at least in part on the lock state 348, as well as information which is to be presented. Information to be presented may be provided by the inventory management system 122 or other systems. For example, the information may include a list of the items 104 to be picked, performance metrics of the user 116, and so forth. As described above, the user interface data 124 is configured to provide, when rendered or otherwise processed, the user interface 128 by way of one or more interface devices 126.

Information to be presented in the user interface 128 may be provided to the user interface module 322 with tags, metadata, or other data which designates a piece of information as confidential. For example, the user interface module 322 may receive extensible markup language (XML) data which provides the pick error rate data for the user 116 and includes an indication that this information is designated confidential. In one implementation, the user interface module 322 may use these tags to generate the user interface data 124 which presents, obscures, omits, or otherwise affects presentation of the information tagged confidential.

In another implementation, the user interface module 322 may include the confidential information in the user interface data 124, as well as tags or other data indicating which portions of the user interface data 124 are confidential. The interface device 126 may then use the tags to determine what information to present, obscure, not present, and so forth based on the lock state 348.

Confidentiality of the information may be determined automatically. For example, the user interface module 322 may be configured to deem confidential 16 digit numbers which correspond to patterns associated with credit card numbers.

Other modules 324 may also be present in the memory 310. For example, a pick statistics module may be configured to generate information indicative of pick error rates of the user 116.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices and so forth.

The data store 326 may include physical layout data 328. The physical layout data 328 provides a mapping of physical positions within the facility of devices and objects such as the sensors 120, inventory locations 114, and so forth. For example, the physical layout data 328 may indicate the coordinates within the facility 102 of an inventory location 114, an RFID reader 120(8) close to that inventory location 114, and so forth. In some implementations, the analysis module 318 may access the physical layout data 328 to determine a distance between two objects, such as the users 116(1) and 116(2), presence of intervening objects such as walls, inventory locations 114, and so forth.

The data store 326 may also include sensor data 330. The sensor data 330 comprises information acquired from, or based on, the one or more sensors 120. For example, the sensor data 330 may comprise three-dimensional information about an object in the facility 102. As described above, the sensors 120 may include an imaging sensor 120(1) which is configured to acquire one or more images. These images may be stored as the image data 332. The image data 332 may comprise information descriptive of a plurality of picture elements or pixels.

The item data 334 comprises information associated with the items 104. The information may include one or more inventory locations 114, at which one or more of the items 104 are stored. The item data 334 may also include order data, SKU or other product identifier, price, quantity on hand, weight, expiration date, images of the item, detail description information, ratings, ranking, and so forth. The inventory management module 316 may store information associated with inventory management functions in the item data 334.

The data store 326 may also store the user data 336. As described above, the user data 336 may include one or more of the user position data 342, the tote position data 344, lock parameters 346, or lock state 348. Individual users 116 or groups of users 116 may selectively provide user data 336 for use by the inventory management system 122, or may authorize collection of the user data 336 during use of the facility 102 or access to user data 336 obtained from other systems. For example, a user 116 may opt-in to collection of the user data 336 to receive enhanced services while using the facility 102.

As described above, the identity data 338 provides information indicative of an identity of the user 116. For example, the identity data 338 may be based on comparing previously stored facial characteristics with those acquired in the image data 332 using facial recognition techniques.

As described above, the device association data 340 provides information which is indicative of which interface device 126 is assigned for use by, is in use by, or was in use by, a particular user 116. The device association data 340 may be determined by the analysis module 318 using the sensor data 330. For example, the tote 118 which includes the interface device 126 may be associated with the user 116 by observing, within the image data 332, that the user 116 is pushing the particular tote 118 for a threshold amount of time. In another example, the device association data 340 may be based on the user 116 approaching and remaining in front of an interface device 126 which is affixed to a wall or other structure in the facility 102.

Other data 350 in the data store 326 may include demographic data about the user 116, such as information indicative of the user's 116 skills, address, contact information, age, and so forth.

The user interface data 124 may also be stored in the data store 326. The user interface data 124 may comprise commands, instructions, tags, markup language, images, color values, or other data. For example, the user interface data 124 may comprise one or more files including HTML, CSS, or JavaScript components.

The data store 326 may store other data 352 as well, such as user preferences, configuration files, and so forth.

The server 204 may also include a power supply 354. The power supply 354 is configured to provide electrical power suitable for operating the components in the server 204.

Figure 4:
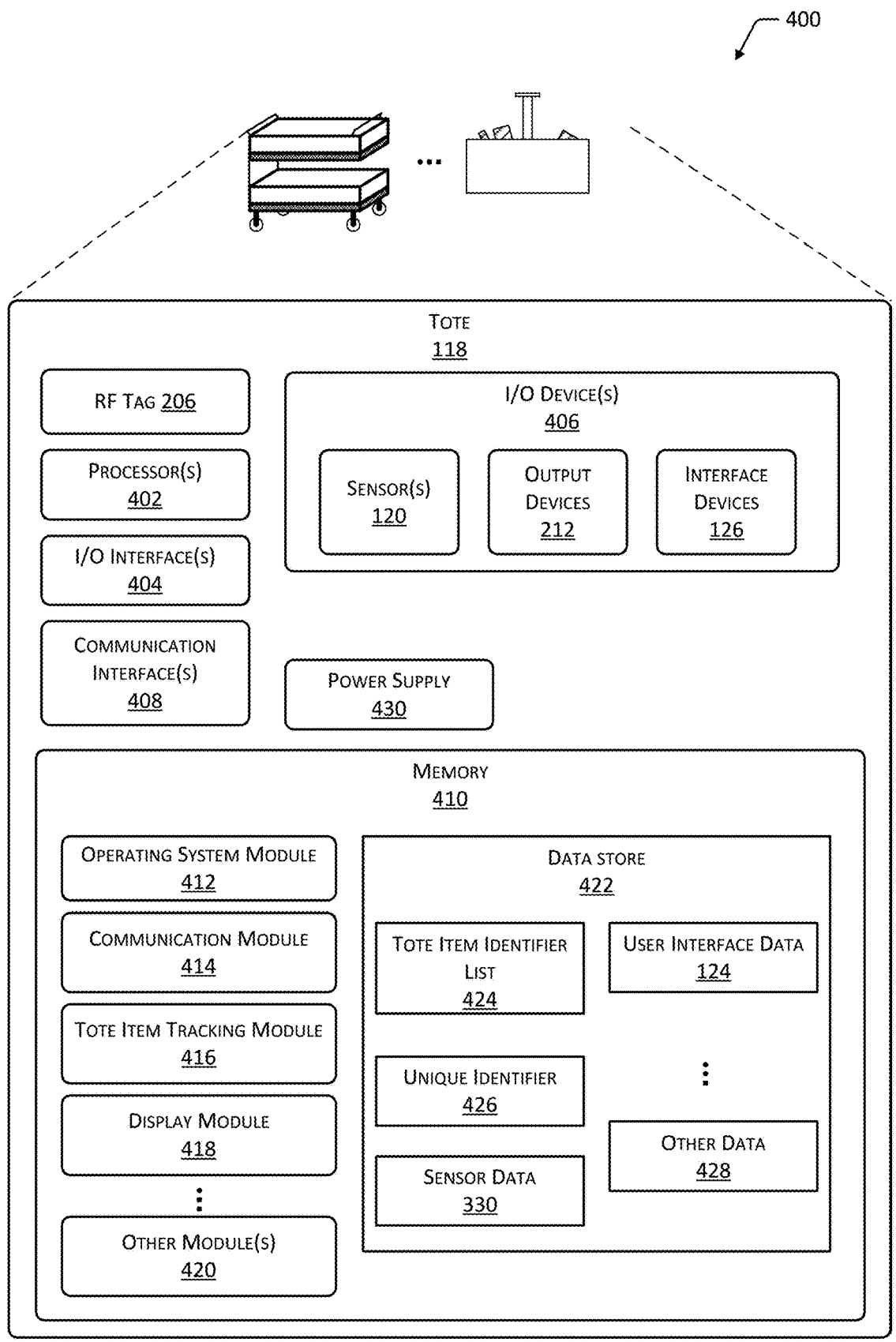
FIG. 4 is a block diagram of a tote, according to some implementations.

FIG. 4 illustrates a block diagram 400 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 212 such as haptic output devices 212(1), audio output devices 212(2), display devices 212(3), and so forth.

The I/O devices 406 may include interface devices 126. The interface device 126 may include an input device such as a sensor 120, an output device 212, or a combination of both. For example, a touchscreen display interface device 126 may incorporate a touch sensor 120(4) and a display device 212(3). In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, interface devices 126, routers, access points, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, interface devices 126, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID or NFC reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface 128 on the display device 212(3) of the tote 118.

The memory 410 may include a display module 418. The display module 418 may be configured to present information, such as received from the one or more servers 204 or generated onboard the tote 118, using one or more of the interface devices 126. For example, the display module 418 may comprise a rendering engine configured to process the user interface data 124 received from the server 204 to generate the user interface 128. In some implementations, the display module 418 may also process input made to the user interface 128 by way of the input devices. Operation of the user interface 128 presented by the display module 418 may be controlled at least in part by the lock state 348. In one implementation, the display module 418 may be configured to determine the lock state 348 onboard the tote 118. In another implementation, the display module 418 may provide one or more of the functions described above with regard to the inventory management module 316.

Other modules 420 may also be stored within the memory 410. In one implementation, a data handler module may be configured to generate data indicative of the user 116, the tote 118, or another of one or more objects in range of the sensors 120 of the tote 118. For example, the data handler module may be configured to acquire data from one or more proximity sensors 120 and provide that sensor data 330 to the analysis module 318 of the server 204.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface.

The data store 422 may also store sensor data 330. The sensor data 330 may be acquired from the sensors 120 onboard the tote 118. The user interface data 124 received by the tote 118 may also be stored in the data store 422.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
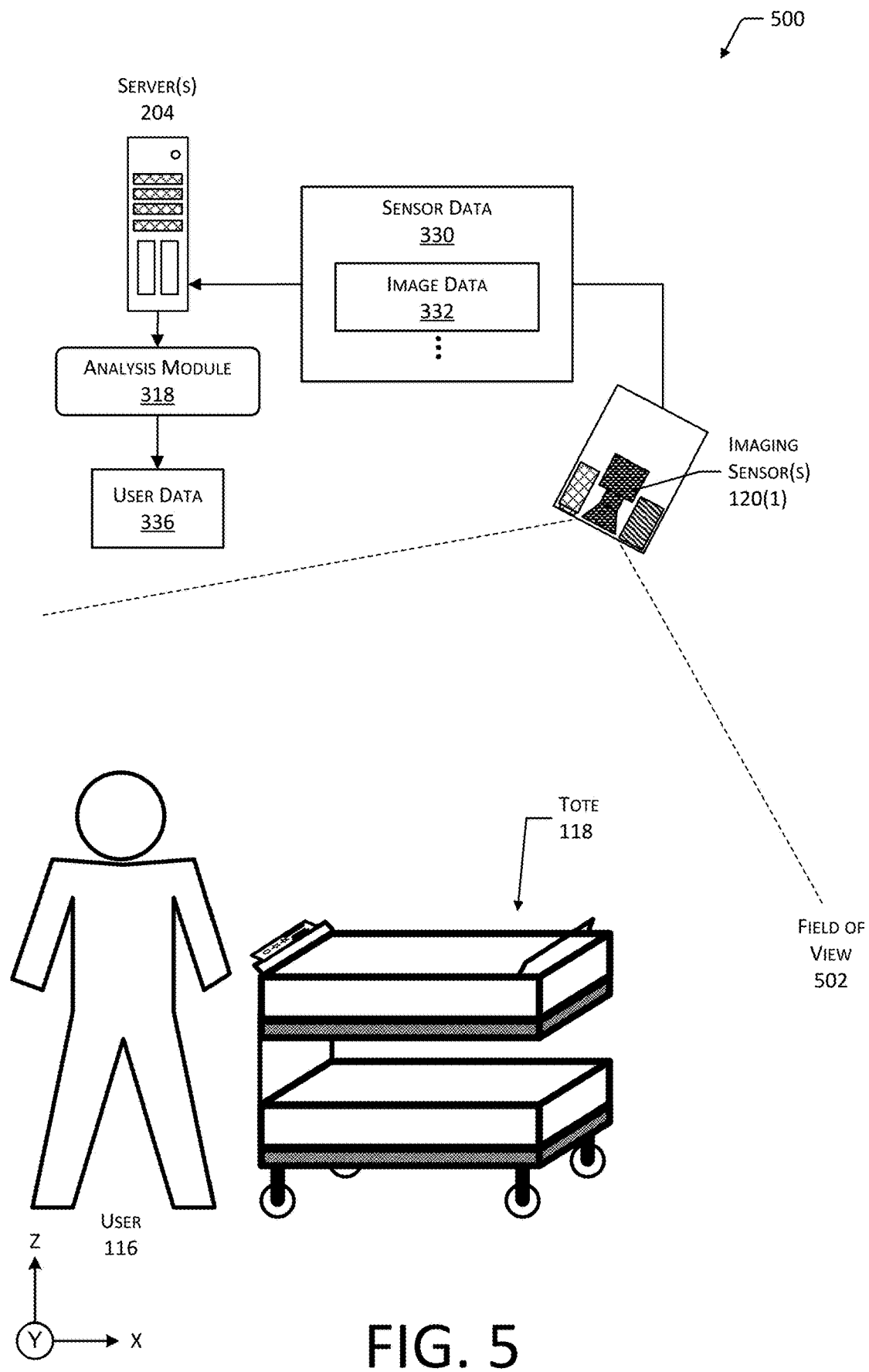
FIG. 5 illustrates an overhead imaging sensor configured to acquire sensor data in the facility, according to some implementations.

FIG. 5 illustrates a side view 500 of an overhead imaging sensor 120(1) acquiring an image of the user 116, the tote 118, and other objects. In some implementations, the facility 102 may include one or more sensors 120 which are configured to acquire an image from an overhead vantage point. For example, the sensors 120 that are configured to acquire images may include, but are not limited to, one or more of imaging sensors 120(1) or 3D sensors 120(2). These sensors 120 may have a field of view 502.

In this illustration, one of the sensors 120 comprises an imaging sensor 120(1) which is configured to generate image data 332. The field of view 502 depicted here includes the user 116 and the tote 118. The image data 332 may be provided to the inventory management system 122. For example, the inventory management module 316 executing on the server 204 may process the image data 332 using the analysis module 318 to generate the user data 336, such as the user position data 342.

Figure 6:
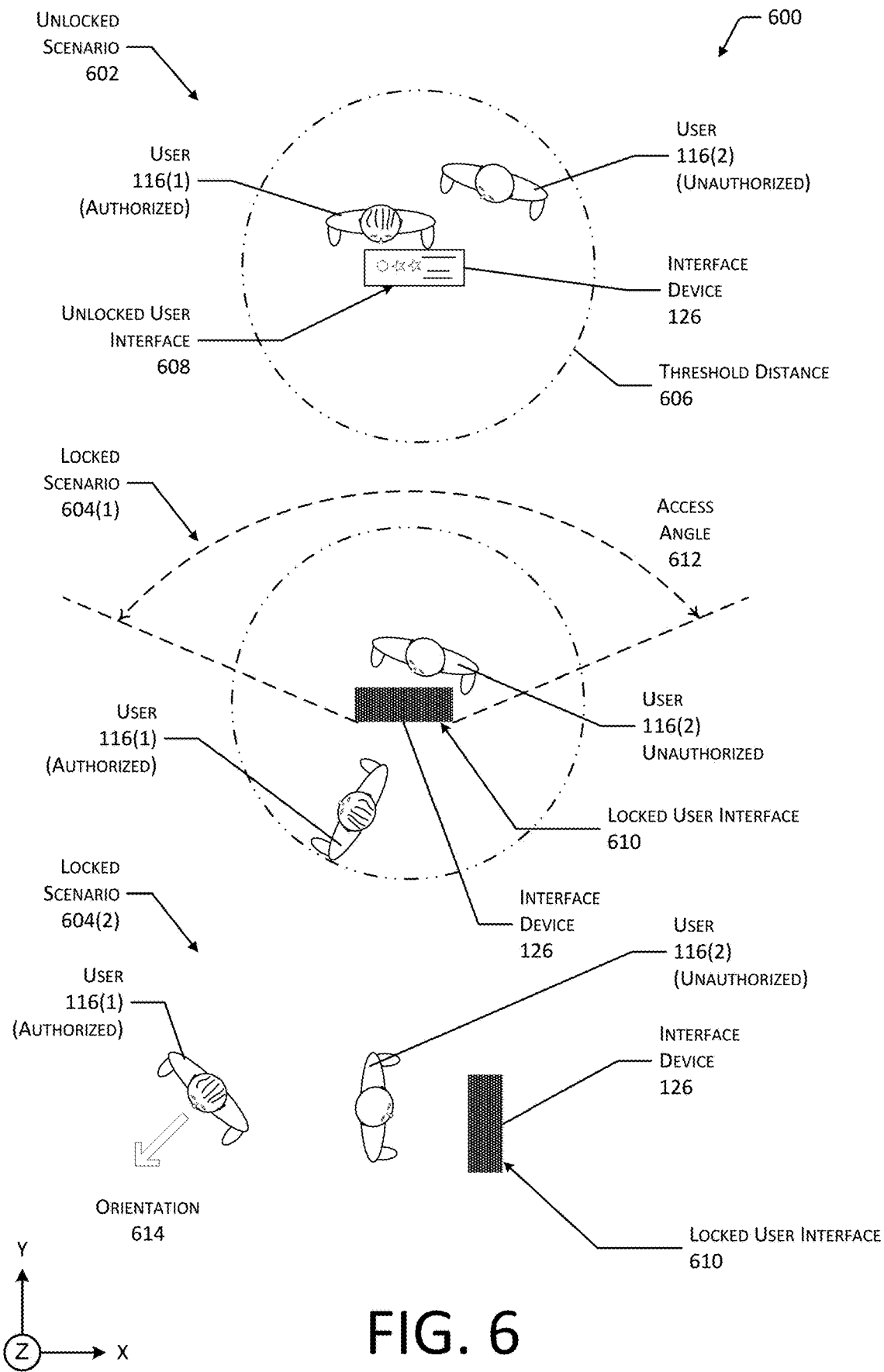
FIG. 6 illustrates scenarios depicting the user interface dynamically locking and unlocking, according to some implementations.

FIG. 6 illustrates scenarios 600 depicting the user interface 128 dynamically changing lock state 348 (locking and unlocking), according to some implementations. This illustration includes an unlocked scenario 602 and two locked scenarios 604(1) and 604(2).

In the unlocked scenario 602, the user 116(1) is authorized to receive presentation of confidential information. For example, the user 116(1) is authorized to have presented on the interface device 126 associated with the user 116(1) confidential information. Also present is the user 116(2) which is unauthorized to access the confidential information. In this scenario, the lock parameters 346 specify a threshold distance 606 and the identity of the authorized user 116(1). So long as the user 116(1) remains within the threshold distance 606, an unlocked user interface 608 is presented by the interface device 126. The presentation is regardless of the presence of other users 116, such as the unauthorized user 116(2). However, should the authorized user 116(1) go beyond the threshold distance 606, the user interface 128 will enter a locked state.

In the first locked scenario 604(1), a locked user interface 610 is presented by the interface device 126. In this scenario, the lock parameters 346 specify the threshold distance 606, the identity of the authorized user 116(1), and an access angle 612. The access angle 612 may include a two dimensional angle or a three-dimensional solid angle specifying a respective area or volume within which the user interface 128 is deemed to be accessible or perceptible to the authorized user 116. For example, the access angle 612 may correspond to the viewing angle of a display device 212(3).

As illustrated here, the authorized user 116(1) is within the threshold distance 606, but outside of the access angle 612. As a result, the locked user interface 610 is presented. The unauthorized user 116(2) may thus be prevented from using the user interface 128, consistent with the level of locking which is supplied. For example, the user interface 128 may be locked to present a lock indicator user interface element and disregard input from the unauthorized user 116(2). Should the authorized user 116(1) reenter the access angle 612 and be within the threshold distance 606, user interface 128 may transition to the unlocked user interface 128. In some implementations, the user interface 608 may remain locked until exit of the unauthorized user 116(2).

In the second locked scenario 604(2), the locked user interface 610 is presented by the interface device 126. As illustrated here, the authorized user 116(1) has an orientation 614 which is facing away from the interface device 126. The lock parameters 346 in this scenario specify the identity of the authorized user 116(1) and orientation of the authorized user 116(1). Based on the lock parameters 346 and the orientation 614 of the authorized user 116(1), the interface device 126 is presenting the locked user interface 610. Should the authorized user 116(1) turn such that they are facing the interface device 126, the lock state 348 may be changed and the unlocked user interface 608 may be presented.

Figure 7:
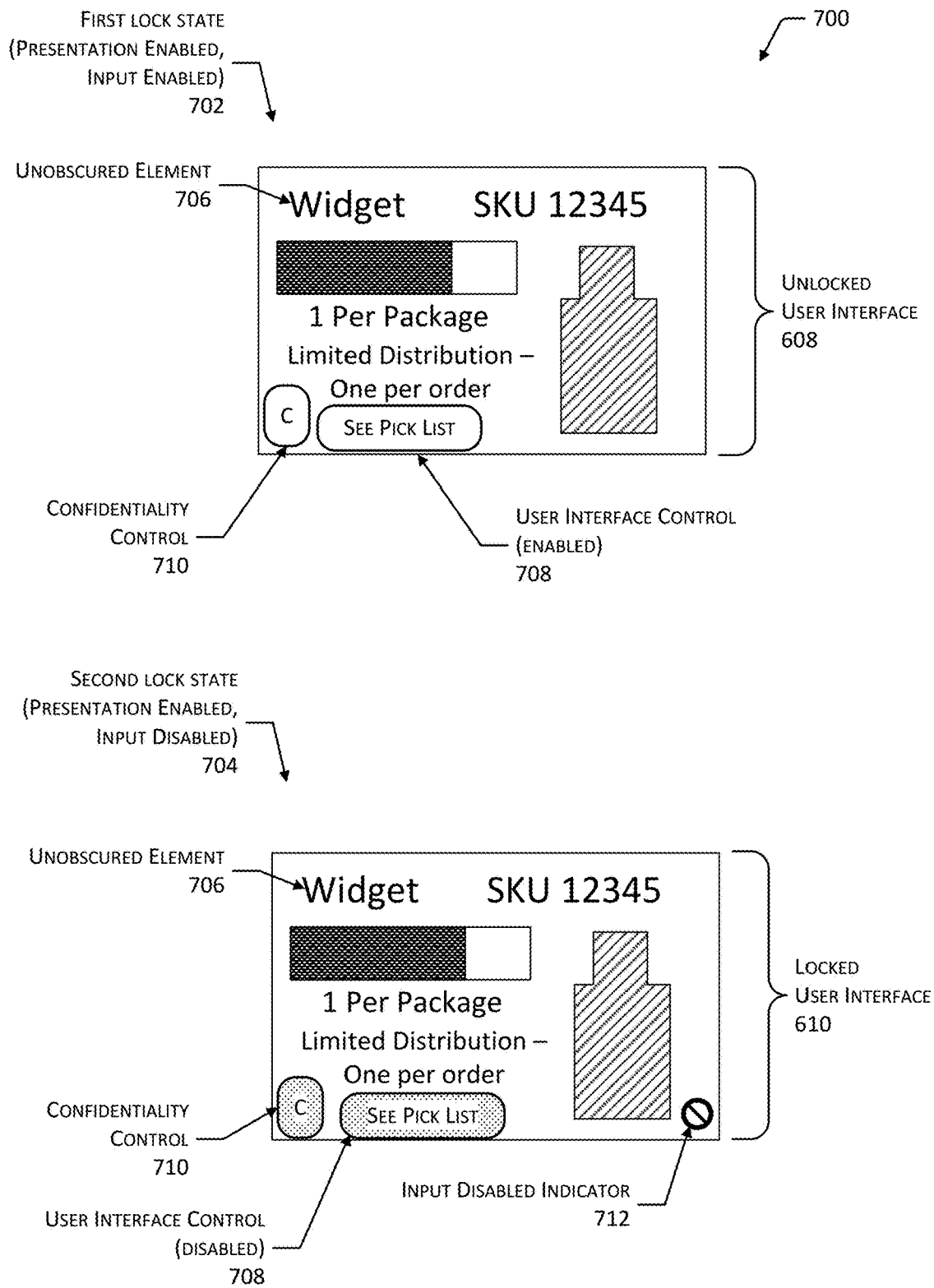
FIGS. 7 and 8 illustrate the user interface in an unlocked state and in various locked states, according to some implementations.

FIG. 7 illustrates examples 700 of the user interface 128 in the unlocked state and in the locked state, according to some implementations. At 702 a first lock state is depicted in which the unlocked user interface 608 is presented while at 704 a second lock state is depicted in which the locked user interface 610 is presented.

As shown in the first lock state 702, the unlocked user interface 608 may include unobscured elements 706, user interface controls 708 (which are enabled), and so forth. While in this state, the user interface 128 presents information including confidential information, and accepts input from the user 116. In some implementations, input may only be accepted from authorized users 116 while in this state.

The user interface 128 may also present a confidentiality control 710. The confidentiality control 710 is configured to activate one or more lock states 348 configured to protect confidential information. For example, activation of confidentiality control 710 may remove or obscure information designated as confidential from the user interface 128. In other implementations, the functionality associated with the confidentiality control 710 may be activated by other input, such as gesture recognition, speech, and so forth.

In some implementations the confidentiality control 710 may be activated automatically. For example, a system administrator may specify that all items 104 in a particular category, such as "jewelry" have the confidentiality control 710 applied. In another implementation, the user 116 may specify activation of the confidentiality control 710 automatically for all items 104 categorized as "health and hygiene". For example, the items 104 may contain items 104 of a sensitive nature. The confidentiality control 710 may be engaged to prevent the user 116(1) (who is picking), or other users 116(2)-(U), from seeing information about the item 104.

As shown in the second lock state 704, the locked user interface 610 is configured to present the confidential and non-confidential information, but input is disabled or disregarded. In this illustration, the second lock state 704 is more restrictive than the first lock state 702. For example, the user interface control 708 is now disabled. This may prevent acceptance input from any user 116, or from unauthorized users 116. In some implementations an input disabled indicator 712 may be presented in the locked user interface 610.

In some implementations, while in the second lock state 704, some input may be accepted. For example, the confidentiality control 710 may remain active such that, when activated the confidential information may be removed or obscured. Furthermore, activation of the confidentiality control 710 may be permitted by any user 116, including an unauthorized user 116.

Figure 8:
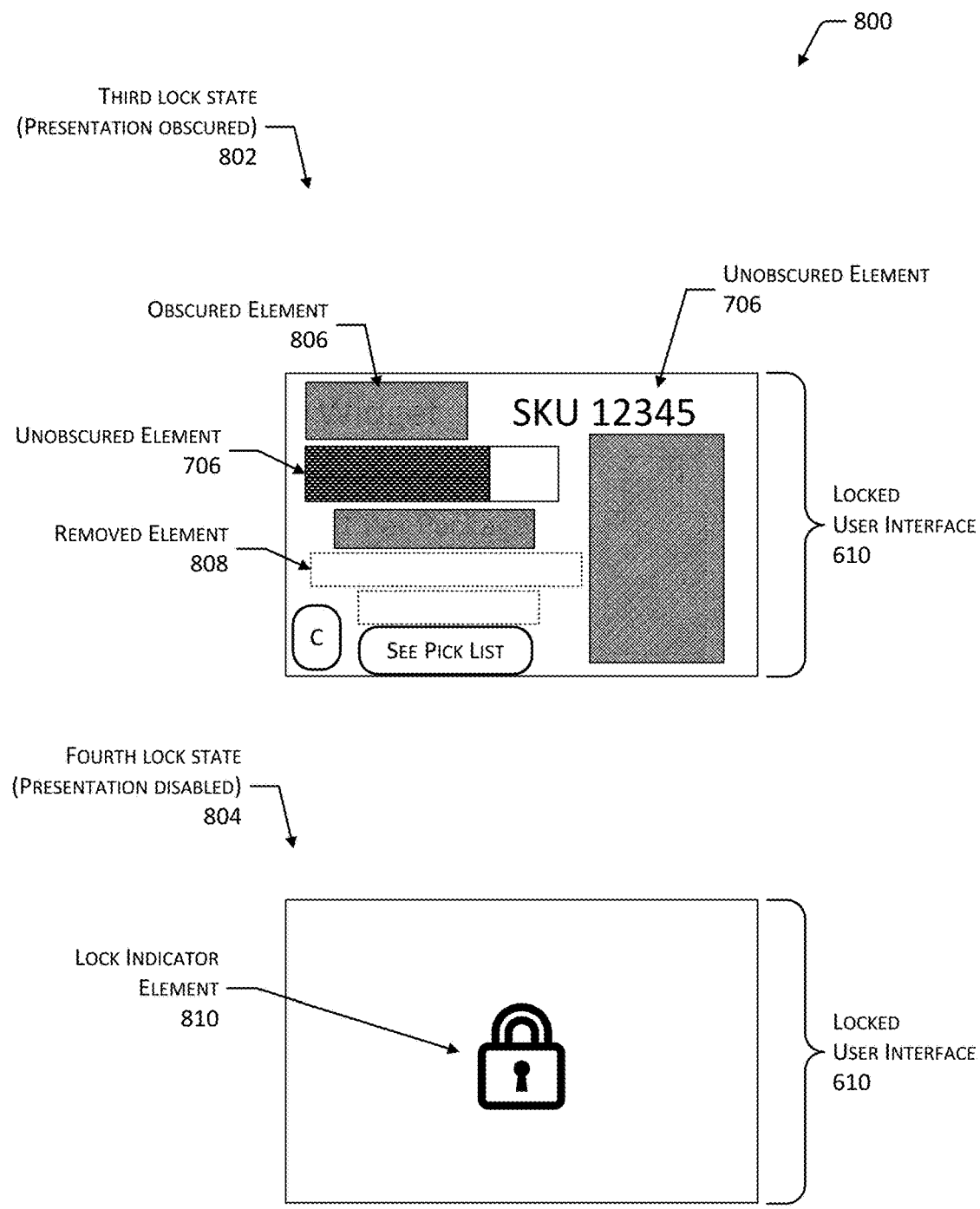

FIG. 8 illustrates additional examples 800 of the user interface 128, according to some implementations. At 802 a third lock state in the locked user interface 610 is depicted in which the confidential information is obscured, while at 804 a fourth lock state is depicted in which a lock indicator element 810 is presented concealing information both confidential and non-confidential.

As shown in the third lock state 802, information which is been designated as non-confidential is still presented as unobscured elements 706, while information designated as confidential are presented as obscured elements 806. In one implementation, the obscured elements 806 may comprise a graphical layer which overlays the confidential information beneath.

Also shown in the third lock state 802 are removed elements 808. The removed elements 808 have been removed from presentation in the user interface 128. For example, the confidential information may be omitted from the user interface data 124. In some implementations placeholder or blank elements may be included in the user interface data 124 such that when the user interface 128 is presented with the removed elements 808, the formatting is unaffected.

In some implementations, activation of the confidentiality control 710 described above may result in the presentation of the third lock state 802. For example, the authorized user 116 may be picking or placing an item and may choose to override the default lock parameters 346 and prevent the presentation of confidential information even while present at the interface device 126.

In the fourth lock state 804, presentation of information both confidential and non-confidential has been discontinued. As depicted here, a lock indicator element 810 is presented. In other implementations, the user interface 128 may be blank. While in the fourth lock state 804, the user interface 128 may be configured to disregard input made to the interface device 126.

Figure 9:
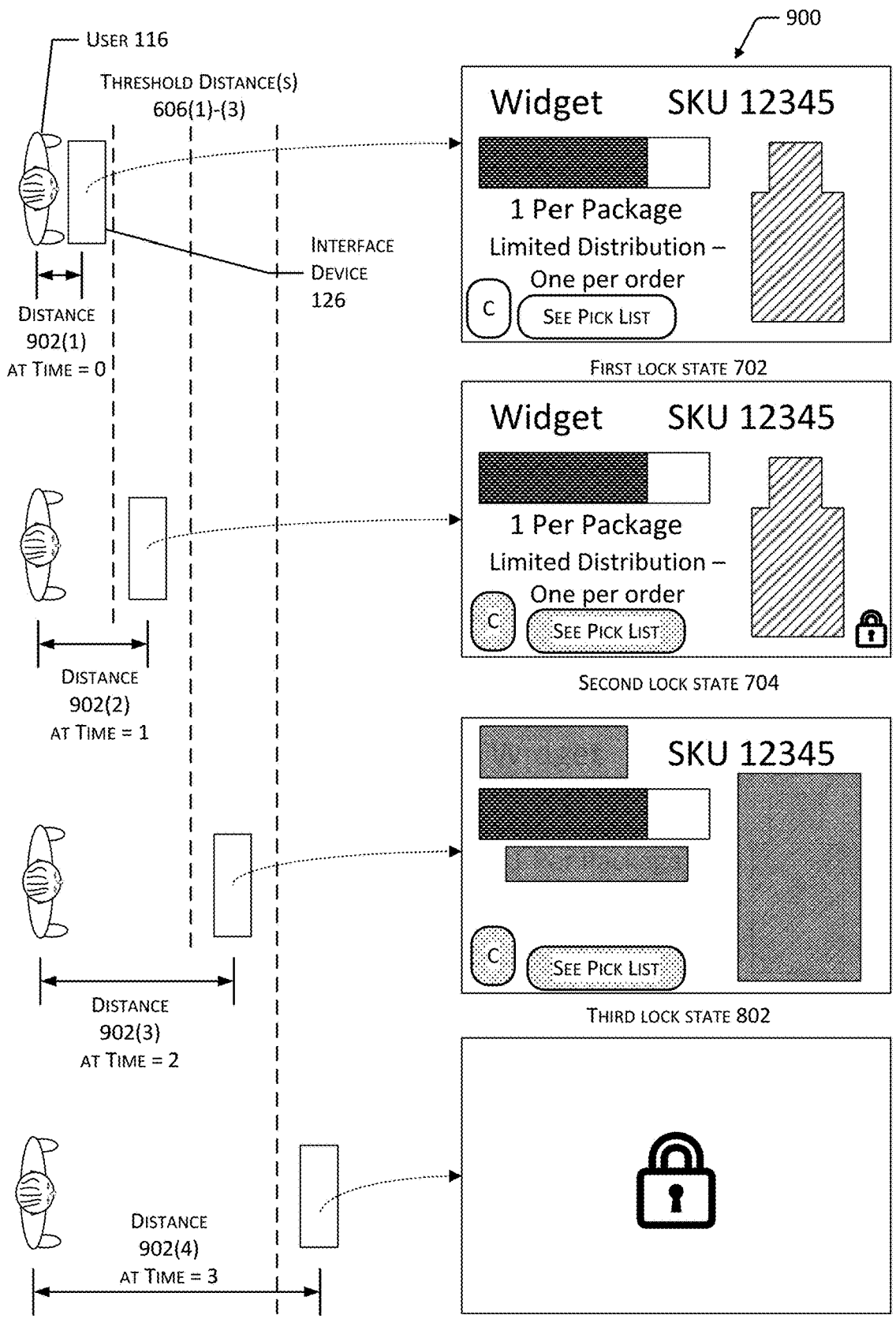
FIG. 9 illustrates a scenario in which the lock state of the user interface is based at least in part on the distance between the user and an interface device, according to some implementations.

FIG. 9 illustrates a scenario 900 in which the lock state 348 of the user interface 128 is based at least in part on the distance between the user 116 and an interface device 126, according to some implementations.

A series of the lock states 702, 704, 802, and 804 as described above in FIGS. 7-8 are presented in sequence of increasing time, such that first lock state 702 is engaged before the second lock state 704, and so forth. In this scenario, the lock parameters 346 specify the identity of the user 116 and the distance between the user 116 and the interface device 126. Depicted are the user 116 and the interface device 126 at successively increasing relative distances between the two. The change in relative distance may result from the movement of the user 116, the interface device 126, or both.

A series of threshold distances 606(1), 606(2), and 606(3) are also depicted at successively increasing distances relative to the user 116. For example, the threshold distance 606(1) is the closest to the user 116 while the threshold distance 606(3) is the farthest from the user 116.

At time=0 and distance 902(1), the user 116 is within the first threshold distance 606(1) and relatively close to the interface device 126. Based at least in part on the user 116 having a position which is within the threshold distance 606(1), the unlocked user interface 608, such as implementing the first lock state 702, is presented.

At time=1 and distance 902(2), the user 116 and the interface device 126 have moved apart, placing the interface device 126 between the threshold distance 606(1) and 606(2). Based at least in part on this position of the interface device 126 beyond the threshold distance 606(1), the lock module 320 generates the user interface data 124. The user interface data 124 is configured to present the second lock state 704 in which information, including confidential information, remains visible but user input is disregarded.

At time=2 and distance 902(3), the user 116 and the interface device 126 have moved farther apart, placing the interface device 126 between the threshold distance 606(2) and 606(3). Based at least in part on this positioning, the lock module 320 generates the user interface data 124 configured to present the third lock state 802 in which confidential information is obscured or removed. For example, the name of the item 104 is obscured while the packaging information has been removed.

At time=3 and distance 902(4), the user 116 and the interface device 126 have moved farther apart still, and the interface device 126 is now beyond the threshold distance

606(3). Based at least in part on this positioning, the lock module 320 generates the user interface data 124 configured to present the fourth lock state 804. As described above, in the fourth lock state 804 the user interface 128 presents a lock indicator element 810. In some implementations, nothing may be presented, such as a blank screen, audio output is disabled or muted, and so forth.

In other implementations, other lock parameters 346 may be used instead of or in addition to the threshold distances 606. For example, orientation of the user 116, presence of the user 116 within an access angle 612, and so forth may be considered in determining the lock state 348.

Illustrative Processes

Figure 10:
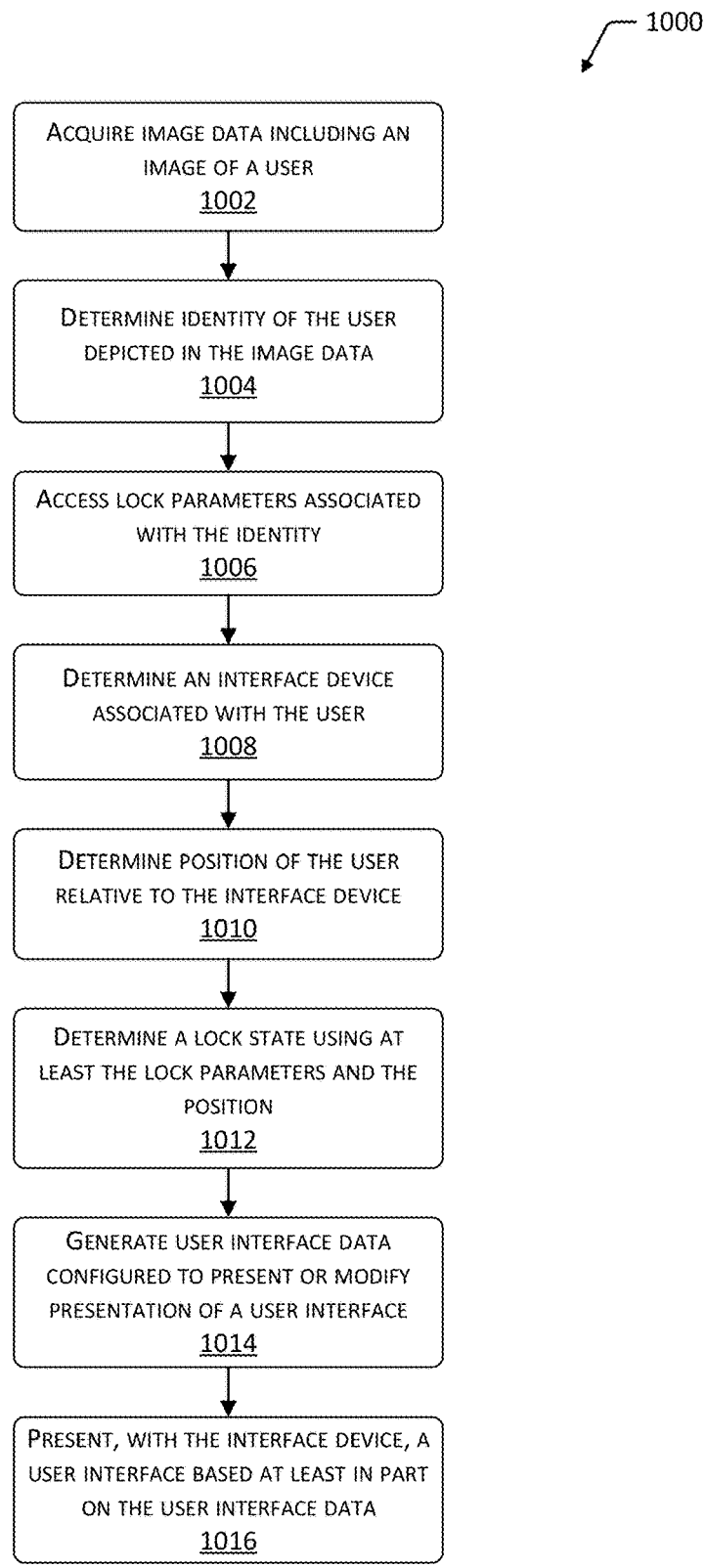
FIG. 10 depicts a flow diagram of a process for locking a user interface based on an identity of the user, according to some implementations.

FIG. 10 depicts a flow diagram 1000 of a process for locking the user interface 128 based on identity data 338 of the user 116, according to some implementations. The process may be performed at least in part by one or more of the inventory management module 316, the display module 418, or other modules.

Block 1002 acquires image data 332. For example, the imaging sensors 120(1) may be configured to generate image data 332 by acquiring images of the user 116 within the facility 102.

Block 1004 determines identity data 338 of the user 116 depicted in the image data 332. The determination may use one or more of: facial recognition, clothing recognition, gait recognition, iris recognition, vascular pattern recognition, hand recognition, ear recognition, fingerprint recognition, or other techniques.

Facial recognition may include analyzing facial characteristics which are indicative of one or more facial features in an image, three-dimensional data, or both. For example, the face of the user 116 may be detected within one or more of the images of the image data 332. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations the facial characteristics may comprise a set of eigenvectors by using principal component analysis (PCA) on a set of images. These eigenvectors as descriptive of a human face may be known as "eigenfaces" or "eigenimages". In one implementation the facial recognition described in this disclosure may be performed at least in part using one or more tools available in the OpenCV library as developed by Intel Corporation of Santa Clara, Calif., Willow Garage of Menlo Park, Calif., and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity. The eigenvectors or other measurements may be compared with previously stored characteristics to determine the identity data 338 of the person in the image, or to distinguish one user 116 from another.

Clothing recognition analyzes images to determine what articles of clothing, ornamentation, and so forth the user 116 is wearing or carrying. Skin and hair detection algorithms may be used to classify portions of the image which are associated with the user's 116 skin or hair. Items which are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. For example, the user 116(2) may be distinguished from the user 116(3) based at least in part on the user 116(2) wearing a hat and a red shirt while the user 116(3) is not wearing a hat and is wearing a blue shirt. The clothing may be used to identify the user 116, or distinguish one user 116 from another.

Gait recognition techniques analyze one or more of images, three-dimensional data, or other data, to assess how a user 116 moves over time. Gait comprises a recognizable pattern of movement of the user's 116 body which is affected by height, age, and other factors. Gait recognition may analyze the relative position and motion of limbs of the user 116. Limbs may include one or more arms, legs, and in some implementations, the head. In one implementation edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116, or distinguish one user 116 from another.

In some implementations, identity may be based on a combination of these or other recognition techniques. For example, the user 116 may be identified based on clothing recognition, gait recognition, and facial recognition. The different recognition techniques may be used in different situations, or in succession. For example, clothing recognition and gait recognition may be used at greater distances between the user 116 and the imaging sensors 120(1) or when the user's 116 face is obscured from view of the imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

In other implementations other techniques for facial recognition, clothing recognition, gait recognition, and so forth may be employed. For example, facial recognition may use iris detection and recognition, clothing recognition may use embedded RF tags 206, gait recognition may utilize data from weight sensors 120(6), and so forth.

Block 1006 accesses lock parameters 346 associated with the determined identity data 338. As described above, the lock parameters 346 may specify conditions under which different lock states 348 are applied. For example, the conditions may specify when the user interface 128 is to be locked and which lock state 348 is to be applied.

Block 1008 determines the interface device 126 associated with the user 116. In one implementation, the association may be based on analyzing the image data 332 to determine the user 116 is within a threshold distance of, or touching, the tote 118, and determining the interface device 126 of the tote 118. For example, the device association data 340 may be accessed to determine the interface device 126 affixed to tote 118. In another implementation, the interface device 126 may be associated with the user 116 after the user 116 enters a username, password, or other identifying information by way of the interface device 126. As described above, the interface device 126 may include a display device 212(3) and a touch sensor 120(4).

Block 1010 determines a position of the user 116 relative to the interface device 126 using the image data 332. For example, the analysis module 318 may determine the user position data 342 and the tote position data 344 upon which the display device 212(3) is mounted. In other implementations the position of the user 116 may be relative to the display device 212(3), the tote 118, another object or area, or a combination thereof. As described above, the position data may include an orientation, indicative of which way an object is facing. The object may include the user 116, the tote 118, and so forth.

Block 1012 determines a lock state 348 using at least the lock parameters 346 and the user position data 342 indicative of the user's 116 position. The lock state 348 specifies an unlocked state or a degree of locking to be applied to the user interface 128. The lock state 348 as implemented by the user interface 128 may restrict one or more of presentation of information or acceptance of input.

In one implementation, the lock parameters 346 may specify a threshold distance 606 between the user 116 and the display device 212(3) beyond which the user interface 128 is to be locked. When the position of the user 116 is determined to meet or exceed the threshold distance 606, the lock module 320 may determine the corresponding lock state 348 as the second lock state 704, the third lock state 802, the fourth lock state 804, or another lock state.

Block 1014 generates, responsive to the lock state 348, the user interface data 124 configured to present or modify presentation of the user interface 128 on the interface device 126. The user interface data 124 may be configured to discontinue presentation of previously presented information on the interface device 126 and present the lock indicator element 810. In one implementation, the lock state 348 may be incorporated into the user interface data 124, and the display module 418 may be configured to adjust presentation of the user interface 128 based on the lock state 348. In another implementation, the user interface data 124 may comprise differential instructions configured to modify or update previously generated user interface data 124.

Block 1016 presents, with the interface device 126, the user interface 128 using the user interface data 124. The user interface 128 presented is unlocked or locked as specified by the lock state 348. In some implementations, the user interface 128 may include one or more elements generated locally on the interface device 126.

In one scenario, the lock parameters 346 may specify a lock state 348 in which the conditions for locking are based on a threshold distance 606 of an authorized user 116(1) and presence of an unauthorized user 116(2) within the threshold distance 606. In this lock state, input from unauthorized users 116(2)-(U) made using the user interface 128 is disregarded. With this scenario, a position of the unauthorized user 116(2) relative to the interface device 126, the display device 212(3), or the tote 118 is determined, as described herein. The user 116(1) and the unauthorized user 116(2) may both be within the threshold distance 606. Based on the lock parameters 346, the lock module 320 may select the lock state 348 in which input by the unauthorized user 116(2) is disregarded and at least a portion of the information is obscured. The user interface data 124 may then be configured to disregard input by the unauthorized user 116(2) and obscure at least a portion of the information presented in the user interface 128. Thus, the lock module 320 provides a lock state 348 which safeguards the confidential information from the unauthorized user 116(2).

Figure 11:
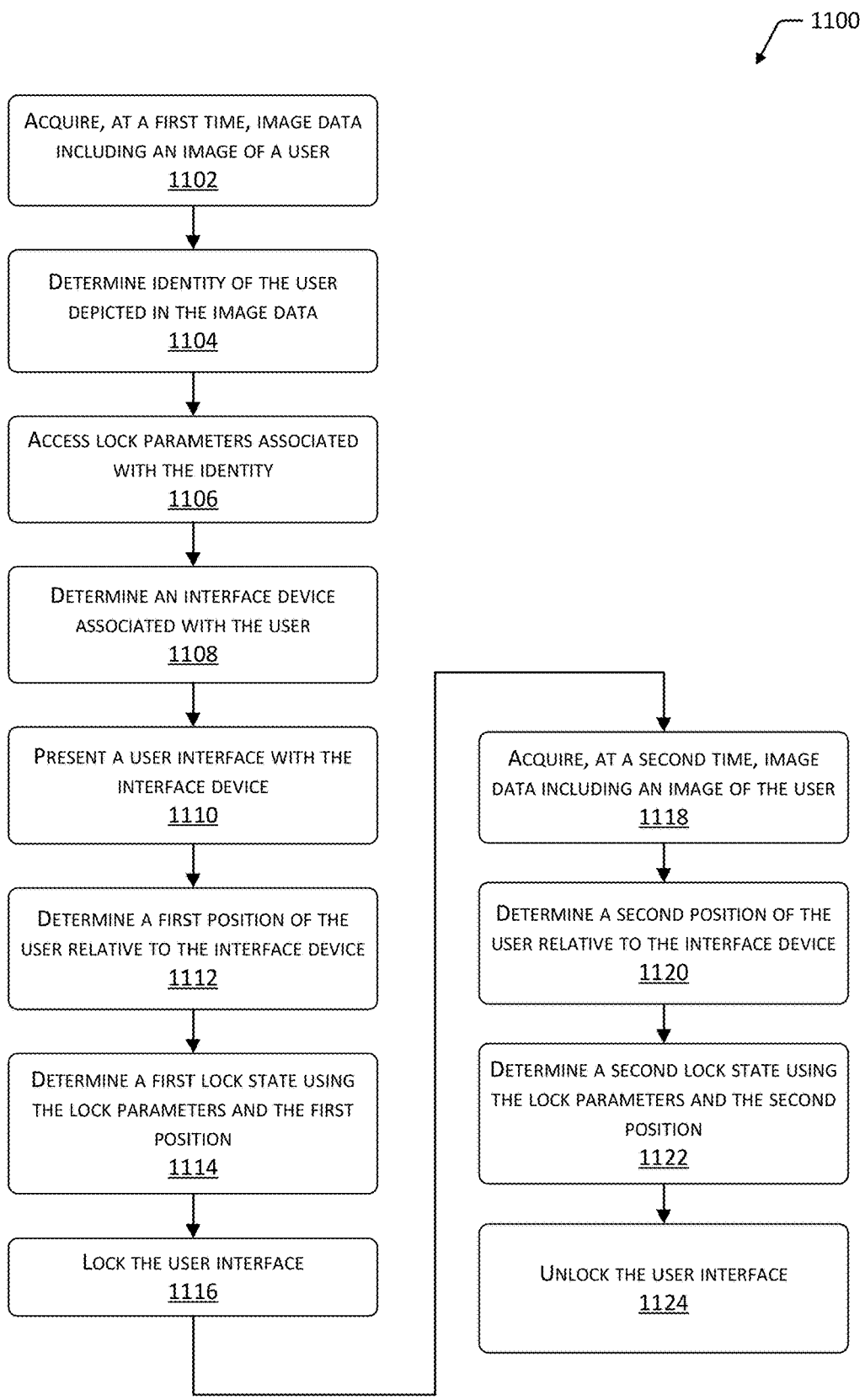
FIG. 11 depicts a flow diagram of another process for locking a user interface based on an identity of the user, according to some implementations.

FIG. 11 depicts a flow diagram 1100 of another process for locking a user interface 128 based on the identity data 338 of the user 116, according to some implementations. The process may be performed at least in part by one or more of the inventory management module 316, the display module 418, or other modules.

Block 1102 acquires, at a first time, sensor data 330 from a plurality of sensors 120. For example, the sensor data 330 may include image data 332 generated from a plurality of imaging devices 120(1). The sensor data 330 may then be accessed. Continuing the example, the sensor data 330 stored in the memory 410 may be accessed.

Block 1104 determines identity data 338 of a user 116 in the facility 102. Continuing the example above, the image data 332 may be analyzed using one or more techniques including facial recognition, clothing recognition, gait recognition, and so forth to generate the identity data 338.

Block 1106 accesses lock parameters 346 associated with the identity data 338. The lock parameters 346 may include one or more of: a threshold distance 606 between the user 116(1) and the interface device 126, a distance between a second user 116(2)-(U) and the interface device 126, a distance between the user 116(1) and the second user 116(2), an access angle 612 of the interface device 126, an orientation of the user 116(1) relative to the interface device 126, an orientation of the second user 116(2) relative to the interface device 126, and so forth. For example, the lock parameter 346 may specify an access angle 612 indicative of an area within which the user interface 128 is deemed to be perceptible, and thus subject to inadvertent release of confidential information. In another example, the lock parameter 346 may specify a lock state 348 when the user 116 is oriented away from the interface device 126.

Block 1108 determines an interface device 126 associated with the user 116. The determination may include one or more of: designating the tote 118 within a threshold distance 606 of the user 116 as associated with the user 116, determining the user 116 has come into physical contact with the tote 118 for a period of time exceeding a threshold, determining the user 116 has placed one or more items 104 within the tote 118, accessing data indicative of an assignment of the tote 118 to the user 116, and so forth. For example, the tote 118 which the user 116 has been pushing along the aisle 112 may be designated as the tote 118 associated with the user 116, and thus the interface device 126 affixed to that tote 118 is determined to be associated with the user 116. In other implementations use of the interface device 126 by the user 116 to authenticate or perform other functions may result in associating the user 116 with the interface device 126, the user 116 to the tote 118 to which the interface device 126 is affixed, and so forth.

Block 1110 presents information in a user interface 128 with the interface device 126. For example, confidential and non-confidential information may be shown on the display device 212(3).

Block 1112 determines a first position of the user 116 relative to the interface device 126. The determination of the relative arrangements may be based on the user position data 342, the tote position data 344, the physical layout data 328, or a combination thereof. For example, the interface device 126 may be in a position in the facility 102, such as on a wall, with the position data available in the physical layout data 328. Continuing the example above, the first position of the user 116(1) is outside of the area defined by the access angle 612 specified in the lock parameters 346.

Block 1114 determines a first lock state 348 using the lock parameters 346 and the first position. Continuing the example above, based on the user 116(1) being outside of the access angle 612, the first lock state 348 is selected. The first lock state 348 may comprise the fourth lock state 804 described above in which presentation of information is disabled and user input is not accepted. In another example, the first position of the user 116(1) including orientation information indicative of the user's 116(1) body being oriented away from the interface device 126 may result in the determination of the first lock state 348.

Block 1116 locks the user interface 128. The locking of the user interface 128 may include one or more of disregarding input at the user interface 128, obscuring at least a portion of visual information in the user interface 128, discontinuing presentation of at least a portion of the information in the user interface 128, presenting a lock indicator element 810, discontinuing presentation of audio, and so forth. The obscuration of the visual information may include applying a blurring effect, function, or filter to the visual information presented in the user interface 128. For example, the blurring may render text unreadable, while retaining characteristics such as overall outline and color of the unobscured element. In one implementation, the blurring may be accomplished by applying a Gaussian blur or Gaussian function to pixels of an image or portion of an image. In another implementation, the blurring may utilize a low-pass filter which attenuates signals above a threshold frequency within the image data. The Gaussian function may be applied to at least a portion of an image comprising the visual information for presentation to generate a blurred image. The blurred image may then be presented in the user interface 128. In another implementation, the Gaussian function may be applied during rendering of the user interface data 124 to generate the blurred image. In this implementation, an unblurred image need not be generated. In yet another implementation, the blurring may comprise application of a blurring filter as an additional display layer. In other implementations, other functions and techniques may be used to blur at least a portion of the information presented by the interface device 126.

The locking of the user interface 128 may be accomplished by sending user interface data 124 modified in accordance with the lock state 348 to the interface device 126. In another example, the lock state 348 may be provided to the interface device 126 which modifies presentation of the existing user interface 128. For example, information indicative of the first lock state 348 may be sent to the interface device 126 using the communication interface 308.

The lock state 348 and corresponding adjustment to the user interface 128 may be ongoing. Block 1118 acquires sensor data 330 from a plurality of sensors 120 at a second time later than the first time. For example, additional image data 332 may be generated by the imaging sensors 120(1) in the facility 102 at a later time.

Block 1120 determines a second position of the user 116 relative to the interface device 126. For example, the user position data 342 and the tote position data 344 may indicate that the user 116 is standing at the back of the tote 118, proximate to the interface device 126, and facing the tote 118.

Block 1122 determines a second lock state 348 using the lock parameters 346 and the second position. For example, now that the user 116 has been identified and is present at the interface device 126, the first lock state 702 is specified by the lock parameters 346.

Block 1124, responsive to the determination of the second lock state 348, unlocks the user interface 128. Continuing the example, the second user interface 128 is updated to the first lock state 702 in which confidential and non-confidential information is presented and input from the authorized user 116 is accepted.

Figure 12:
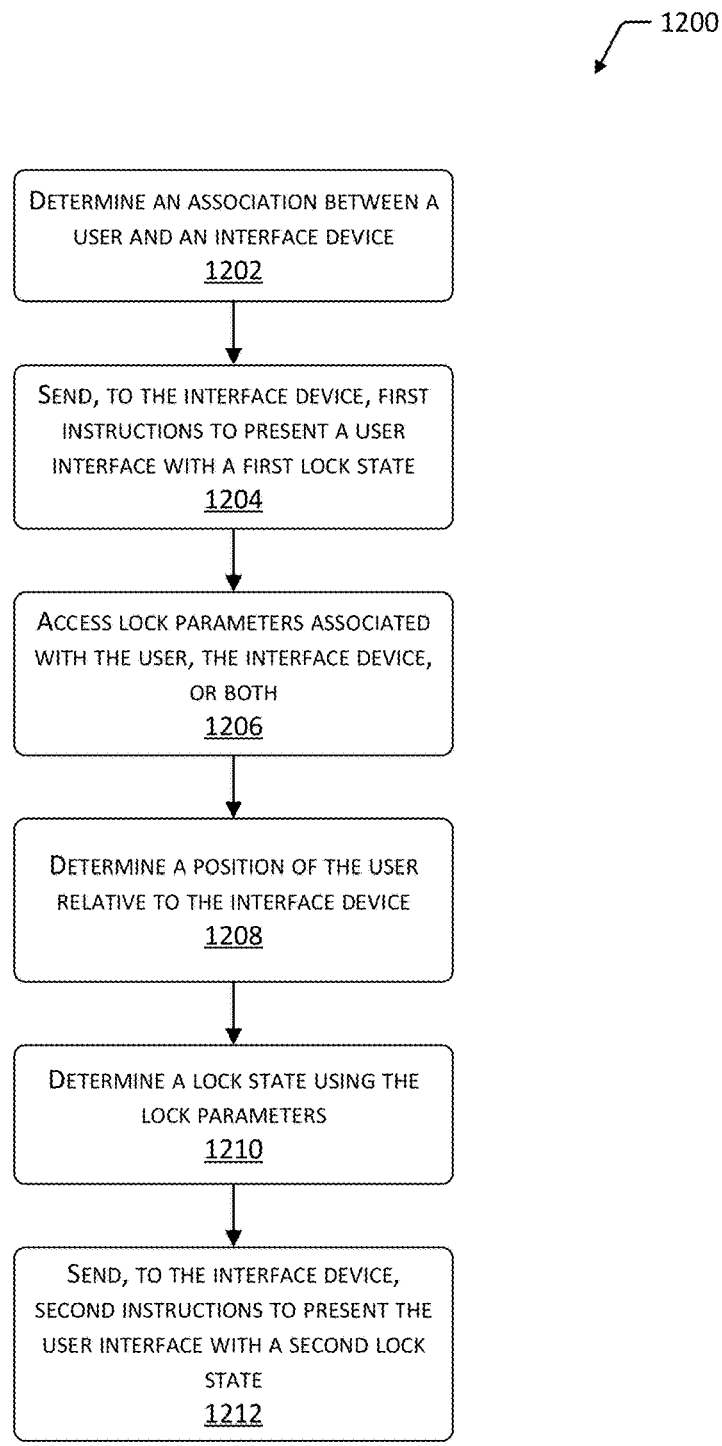
FIG. 12 depicts a flow diagram of a process for controlling a lock state of a user interface, according to some implementations.

FIG. 12 depicts a flow diagram 1200 of a process for controlling a lock state 348 of a user interface 128, according to some implementations. The process may be performed at least in part by one or more of the inventory management module 316, the display module 418, or other modules.

Block 1202 determines an association between a user 116 and an interface device 126. For example, the association may be that the user 116 is carrying the tote 118 with the interface device 126 affixed thereto. In another example, the association may be that the user 116 is standing next to an interface device 126 affixed to an inventory location 114, wall, or ceiling of the facility 102. The interface device 126 may include one or more of: a haptic output device 212(1) configured to produce tactile sensations in the user 116, an audio output device 212(2) configured to generate sound, or a display device 212(3) configured to present visual output.

Block 1204 sends, to the interface device 126, first instructions to present a user interface 128 with a first lock state. The first lock state may comprise an unlocked state such as the first lock state 702 in which input to the user interface is accepted, presentation is unrestricted, or a combination thereof.

Block 1206 accesses one or more lock parameters 346. For example, the lock parameters 346 may comprise one or more of: a threshold distance 606 between the user 116 and the interface device 126, an access angle 612 indicative of an area in which the user interface 128 is perceptible, or an orientation of the user 116 relative to the interface device 126.

Block 1208 determines a position of the user 116 relative to the interface device 126. For example, the sensor data 330 from the 3D sensor 120(2) may be accessed to provide position of the user 116 and the interface device 126 and the relative positioning may be derived therefrom.

In some implementations, a block (not shown) receives input at the user interface 128. For example, touch input may be received by the touch sensor 120(4) of the interface device 126.

Block 1210 determines a lock state 348 using the lock parameters 346. In some implementations the lock state 348 may be responsive to the input. For example, the input may comprise the user 116 activating the confidentiality control 710.

Block 1212 sends, to the interface device 126, second instructions to present the user interface 128 with a second lock state. The user interface 128 as presented to the user 116 is thus transitioned from the first lock state to the second lock state. The second lock state may modify or replace at least a portion of information presented by the first lock state. For example, the second lock state may obscure, remove, obfuscate, and so forth, the information of the first lock state. The second lock state may comprise a locked state such as the second lock state 704, the third lock state 802, the fourth lock state 804, and so forth. In some implementations the second lock state may be configured to disregard input to the user interface 128. Continuing the above example, the transition to the second lock state may be responsive to the input, such as the activation of the confidentiality control 710.

In one implementation, the transition of the user interface 128 may include: sending (to the interface device 126) the user interface data 124 which includes the lock state 348, sending the user interface data 124 generated based on the lock state 348, or sending data indicative of the lock state 348. The interface device 126, such as on the tote 118, may receive the user interface data 124 or the data indicative of the lock state 348 and present the user interface 128 by way of the interface device 126.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for presenting information to a user in a materials handling facility, the system comprising:
    a plurality of cameras configured to acquire image data within the materials handling facility, the image data including one or more images of the user;
    a tote comprising:
        a first wireless communication interface;
        a display device;
        a touch sensor configured to receive input from the user;
        a first memory, storing first computer-executable instructions; and
        a first hardware processor in communication with the first wireless communication interface, the display device, the touch sensor, and the first memory, wherein the first hardware processor is configured to execute the first computer- executable instructions to:
            present a user interface with the display device; and
            receive input from the touch sensor;
    a second wireless communication interface configured to communicate with the first wireless communication interface of the tote;
    a second memory, storing second computer-executable instructions; and
    a second hardware processor in communication with the plurality of cameras, the second wireless communication interface, and the second memory, wherein the second hardware processor is configured to execute the second computer-executable instructions to:
        identify information comprising at least a first subset of confidential information associated with one or more users or one or more items in the materials handling facility;
        determine an identity of the user depicted in the image data using at least one or more of:
            facial recognition,
            clothing recognition, or
            gait recognition;
        access lock parameters associated with the identity of the user, wherein the lock parameters at least partially specify conditions under which the user interface presents or excludes the first subset of confidential information with the display device and accepts or disables input from the touch sensor, based on a specific category of a specific item;
        determine, using the image data, that the user has placed an item of the one or more items within the tote;
        determine that the tote is associated with the user based on association data;
        determine, using the image data, a category of the item;

determine, using the image data, an orientation of a body of the user relative to the display device;
determine a lock state based on the lock parameters, information regarding the category of the item, and the orientation, wherein:
the lock state comprises information indicative of excluding presentation of the first subset of confidential information by the user interface on the display device, and
the lock state further comprises information indicative of disabling input acquired by the touch sensor;
based on the lock state, generate user interface data for use in implementing the lock state, wherein:
the user interface data specifies the first subset of confidential information is excluded from presentation by one or more of obscuring, removing, or obfuscating the first subset of confidential information presented by the user interface, and
the user interface data further specifies disabling input acquired by the touch sensor; and
using the user interface data, implement the lock state by obscuring, removing, or obfuscating the first subset of confidential information presented by the user interface on the display device and disabling input from the touch sensor.

2. The system of claim 1, wherein:
the lock parameters specify a threshold angle between the body of the user and the display device beyond which the user interface is restricted in the presentation of the information; and
further wherein the second hardware processor is configured to execute the second computer-executable instructions to:
determine the orientation of the body of the user is beyond the threshold angle; and
wherein the user interface data includes instructions to:
discontinue presentation of the information on the display device, and
present a lock indicator user interface element on the display device.

3. The system of claim 1, wherein:
the user is a first user;
the lock parameters specify:
a threshold distance between the first user and the display device beyond which presentation of the information on the display device is restricted, and input from a second user is to be disregarded; and
the second hardware processor is further configured to execute the second computer- executable instructions to:
determine a position of the first user is within the threshold distance;
determine, using the image data, a position in three-dimensional space of the second user relative to the display device;
determine the position of the second user is within the threshold distance;
acquire input from the second user at the touch sensor; and
disregard the input from the second user.

4. A method comprising:
accessing sensor data associated with a user, as acquired by one or more sensors at a facility;
identifying information comprising a first subset of confidential information associated with one or more users or one or more items in the facility;
using the sensor data, determining an identity of the user in the facility;
accessing lock parameters associated with the identity of the user, wherein:
the lock parameters specify conditions under which a user interface of an interface device presents or excludes the first subset of confidential information and accepts or disables input, based on a specific category of a specific item;
determining that the user has placed an item of the one or more items within a tote comprising the interface device, using the sensor data;
determining a category of the item within the tote comprising the interface device, using the sensor data;
determining the interface device is associated with the user based on association data;
determining a first orientation of a body of the user relative to the interface device using the sensor data;
determining a first lock state based on the lock parameters, information about the category of the item, and the first orientation, wherein
the first lock state comprises information indicative of excluding presentation of the first subset of confidential information by the user interface of the interface device;
based on the first lock state, generating user interface data for use in implementing the first lock state, wherein:
the user interface data specifies the first subset of confidential information is to be excluded from presentation by one or more of obscuring, removing, or obfuscating the first subset of confidential information presented by the user interface of the interface device, and
the user interface data further specifies one or more of processing or disregarding any input; and
implementing the first lock state by obscuring, removing, or obfuscating the first subset of confidential information presented by the user interface of the interface device using the user interface data, wherein the interface device is a display device.

5. The method of claim 4, further comprising:
sending the user interface data to the interface device.

6. The method of claim 4, wherein the lock parameters comprise one or more of:
an orientation of the user relative to the interface device, or
an orientation of a second user relative to the interface device.

7. The method of claim 4, wherein the determining the interface device that is associated with the user comprises designating the user within a threshold distance of the interface device that is associated with the tote.

8. The method of claim 4, wherein:
the user interface data includes one or more instructions for:
obscuring the first subset of confidential information in the user interface of the interface device,
discontinuing presentation of the first subset of confidential information in the user interface of the interface device,
presenting a lock indicator element, or
discontinuing presentation of audio.

9. The method of claim 4, further comprising:
determining a position in three-dimensional space of the user relative to the interface device; and determining a second lock state using the lock parameters and the position, wherein the second lock state is less restrictive than the first lock state.

10. The method of claim 4, wherein the lock parameters specify an access angle, the access angle comprising an angle relative to the interface device within which the user interface is perceptible to the user;
the method further comprising:
determining a position of the user is outside of the access angle.

11. The method of claim 4, wherein the determining the interface device that is associated with the user comprises determining the user has come into physical contact with the tote for a period of time exceeding a threshold time.

12. The method of claim 4, further comprising:
wherein the user interface of the interface device includes information about the category of the item.

13. A system comprising:
a plurality of imaging sensors configured to acquire image data related to a user from within a facility;
a communication interface configured to communicate with an interface device;
a memory, storing computer-executable instructions;
a first hardware processor in communication with the plurality of imaging sensors, the communication interface, and the memory, wherein the first hardware processor is configured to execute the computer-executable instructions to:
identify information comprising a first subset of confidential information associated with one or more users or one or more items in the facility;
determine an identity of the user using the image data;
determine an orientation in space of a body of the user relative to the interface device using the image data;
access lock parameters associated with the identity of the user, wherein the lock parameters at least partially specify conditions under which a user interface of the interface device presents or excludes the first subset of confidential information based on a specific category of a specific item;
determine that the user has placed an item of the one or more items within a tote comprising the interface device, using the image data;
determine a category of the item using the image data;
determine the interface device is associated with the user based on association data;
determine a lock state based on the lock parameters, the category of the item, and the orientation, wherein:
the lock state comprises information indicative of excluding presentation of the first subset of confidential information by the user interface of the interface device;
based on the lock state, generate instructions for use in implementing the lock state, wherein:
the instructions specify the first subset of confidential information is to be excluded from presentation by one or more of obscuring, removing, or obfuscating the first subset of confidential information presented in the user interface of the interface device; and
send, to the interface device, the instructions to implement the lock state by obscuring, removing, or obfuscating the first subset of confidential information presented by the user interface of the interface device, according to the instructions; and
the interface device comprising:
a display device; and
a second hardware processor to process the instructions to:
implement the lock state on the display device by obscuring, removing, or obfuscating the first subset of confidential information presented by the user interface on the display device.

14. The system of claim 13 wherein:
the lock state comprises second instructions to disable input from the interface device.

15. The system of claim 13, wherein the lock parameters designate an orientation of the user relative to the interface device.

16. The system of claim 13, wherein the first hardware processor is further configured to execute the computer-executable instructions to:
receive input from the interface device; and
disregard the input from the interface device.

17. The system of claim 13, wherein the first hardware processor is further configured to execute the computer-executable instructions to:
send, to the interface device, information regarding the category of the item.

18. The system of claim 13, further comprising:
an inventory location configured to hold the one or more items; and
wherein the interface device is affixed to the inventory location.

19. The system of claim 13, further comprising:
the tote comprising:
the interface device, the interface device comprising:
an inventory location configured to hold the one or more items;
a second communication interface configured to communicate with the communication interface; and
a second memory, storing the instructions.

20. The system of claim 13, wherein the first hardware processor is further configured to execute the computer-executable instructions to:
determine that the user has come into physical contact with the tote for a period of time exceeding a threshold time.

* * * * *